United States Patent [19]

Tamura

[11] Patent Number: 5,191,493
[45] Date of Patent: Mar. 2, 1993

[54] CASSETTE EJECTING MECHANISM OF A TAPE PLAYER

[75] Inventor: Masafumi Tamura, Kanagawa, Japan
[73] Assignee: Sony Corporation, Tokyo, Japan
[21] Appl. No.: 641,684
[22] Filed: Jan. 16, 1991

[30] Foreign Application Priority Data

Jan. 20, 1990 [JP] Japan .................................. 2-11505

[51] Int. Cl.⁵ ....................... G11B 5/008; G11B 15/66
[52] U.S. Cl. ..................................... 360/96.5; 360/85
[58] Field of Search .................. 360/96.5, 96.6, 85, 360/95

[56] References Cited

U.S. PATENT DOCUMENTS

| | | | |
|---|---|---|---|
| 4,586,095 | 4/1986 | Olmsted | 360/96.5 |
| 4,956,732 | 9/1990 | Moriyama | 360/95 |
| 4,985,789 | 1/1991 | Kodama et al. | 360/85 |
| 4,985,790 | 1/1991 | Komatsu et al. | 360/96.5 |

Primary Examiner—David J. Severin
Attorney, Agent, or Firm—Alvin Sinderbrand; William S. Frommer

[57] ABSTRACT

A cassette ejecting mechanism of a tape player includes a cassette holder having a portion to be locked and a head drum withdrawal lever having a lock portion. When the cassette holder is moved to a loading position, the lock portion of the head drum withdrawal lever prevents the cassette holder from moving toward an ejecting position and locks it at a loading position. When the head drum withdrawal lever is retracted, the lock is released to permit the cassette holder to move to the ejecting position. At the same time, the portion to be locked of the cassette holder is located in front of the lock portion of the head drum withdrawal lever and prevents the head drum withdrawal lever from returning to a forward position, that is, the head drum is locked at the retracted position. Accordingly, locking and unlocking of the cassette holder in and from the loading position as well as locking of the head drum in the retracted position can be reliably carried out in a predetermined order by means of the cassette holder and the intermediate lever alone.

14 Claims, 30 Drawing Sheets

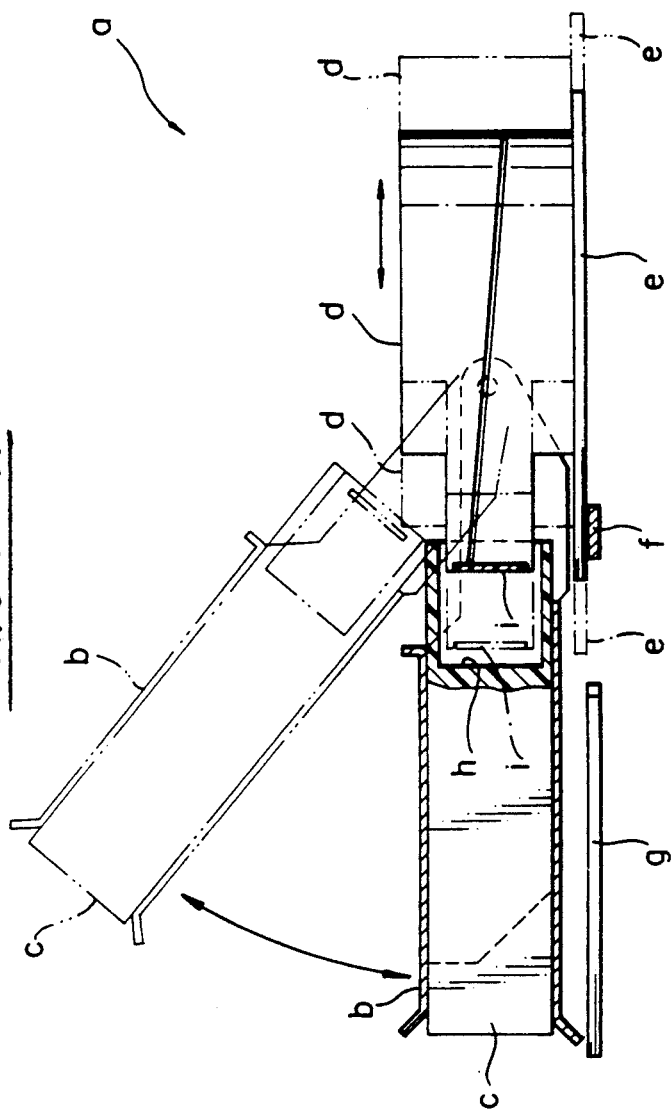

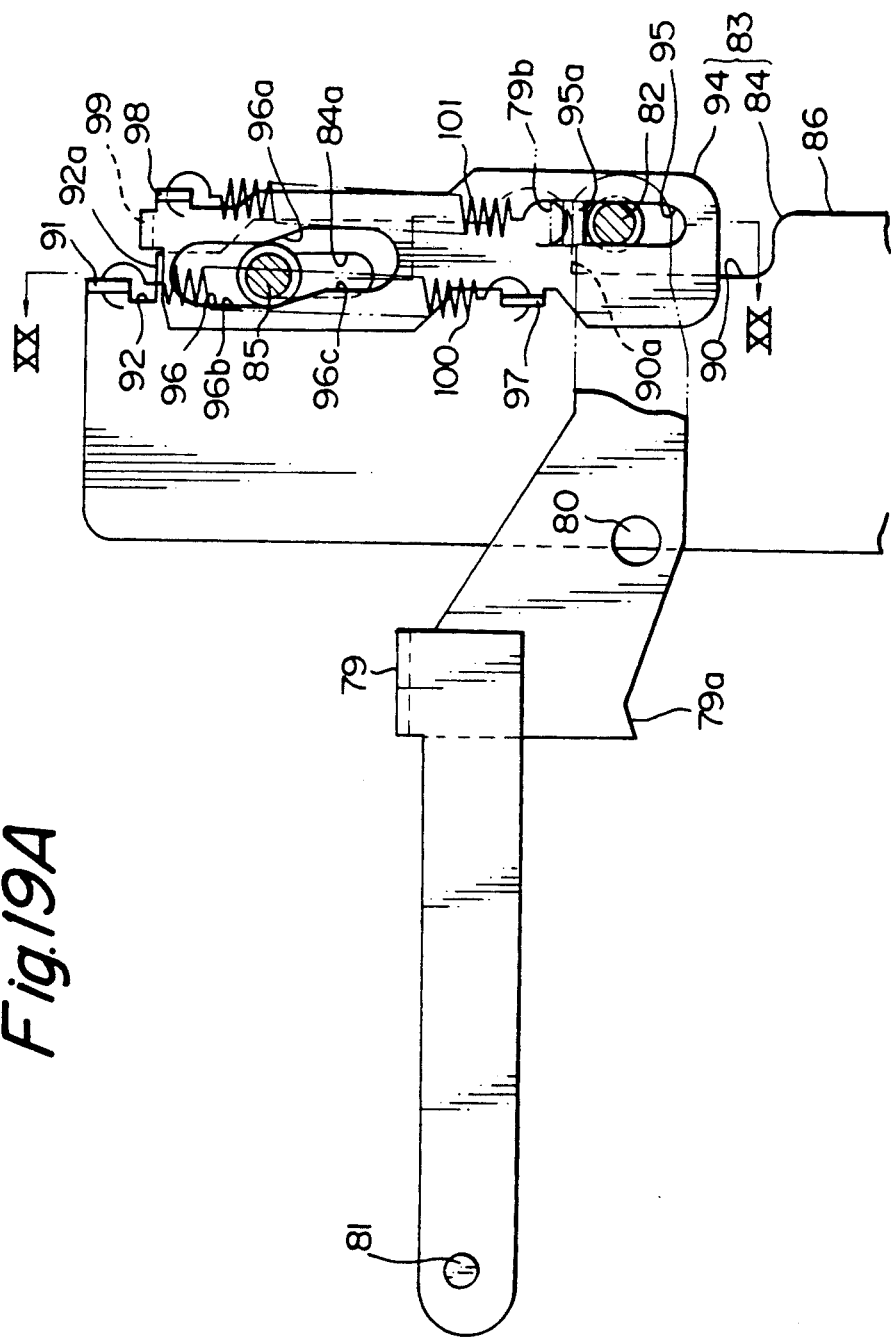

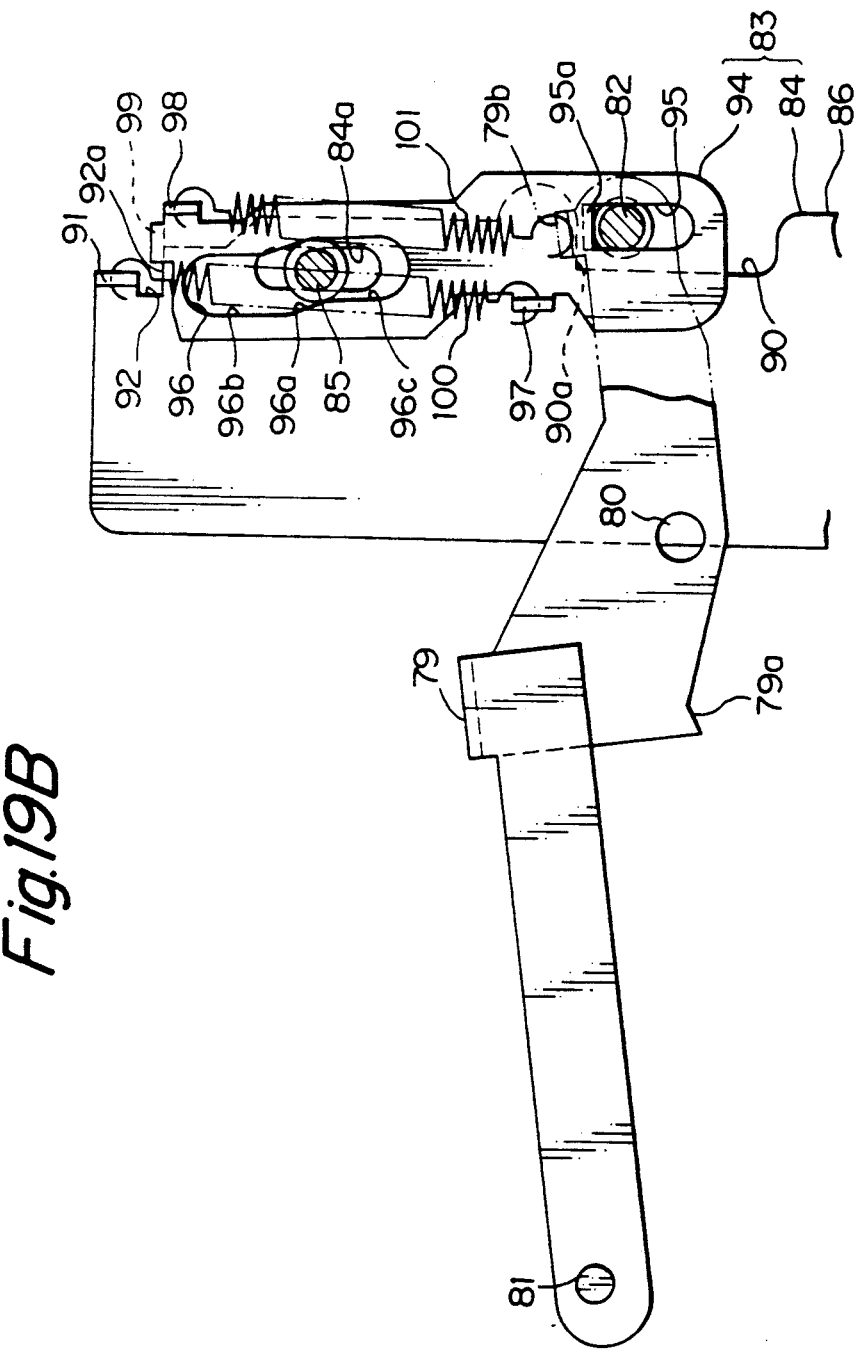

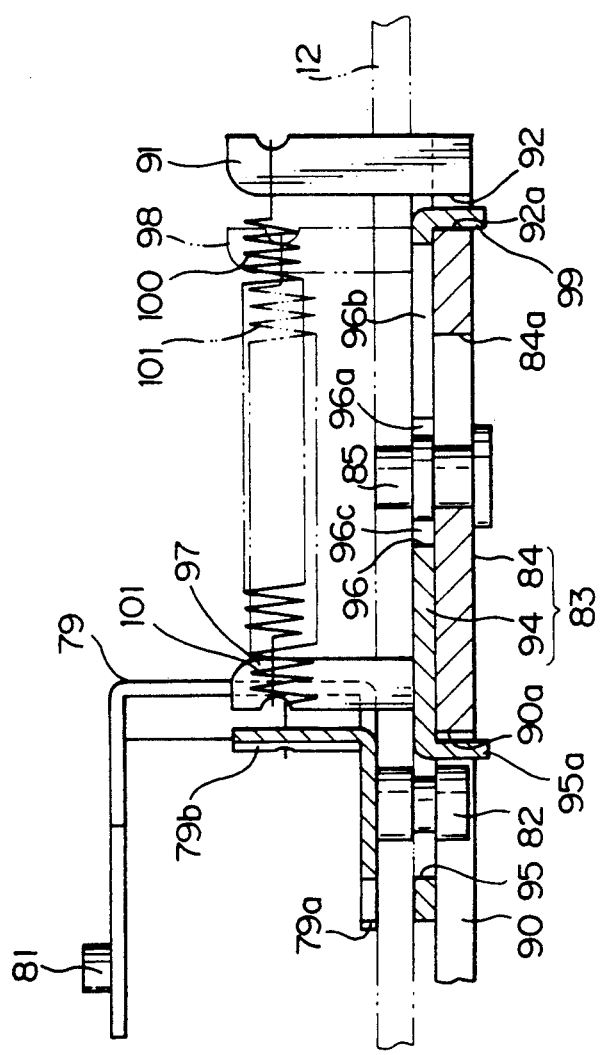

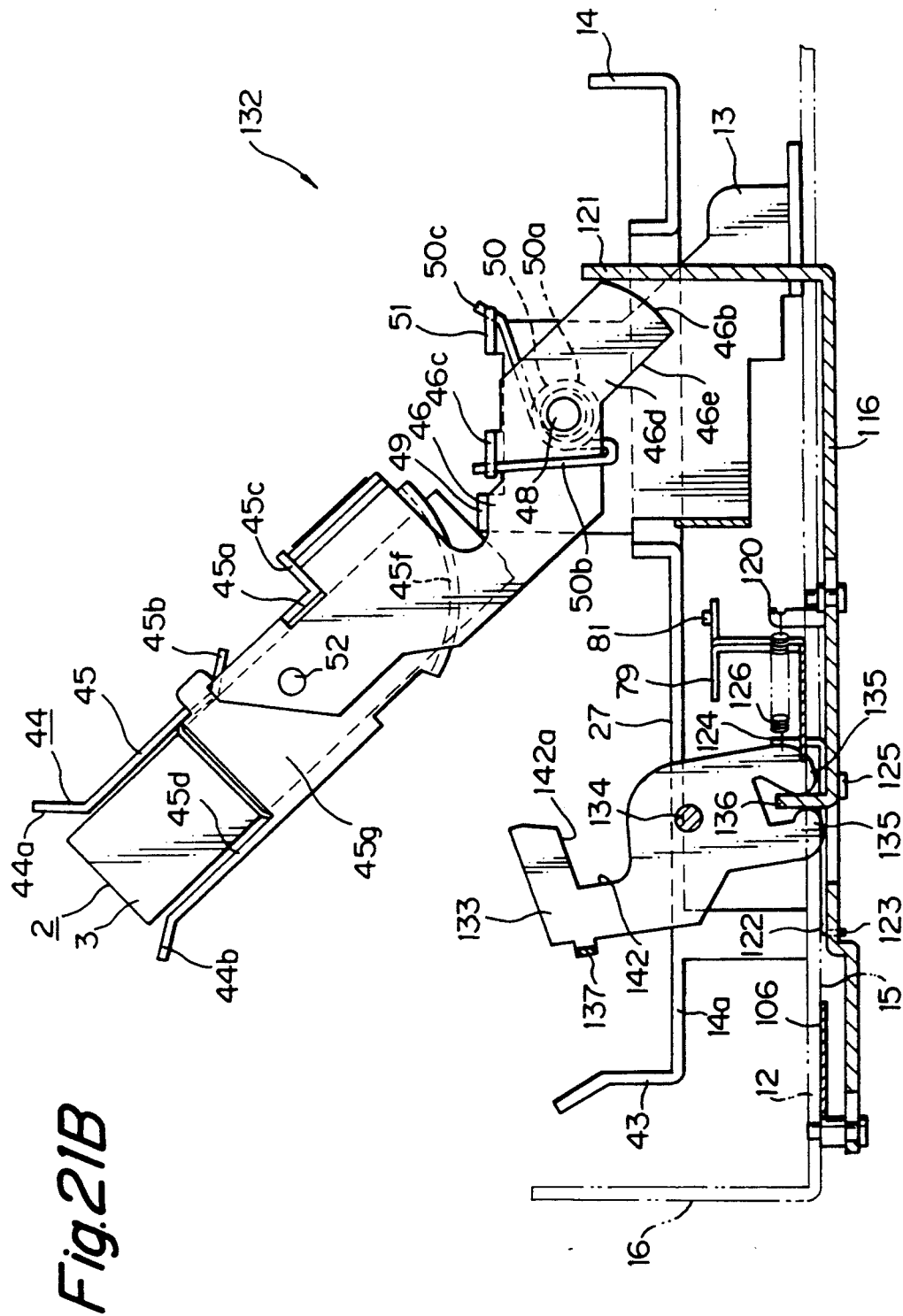

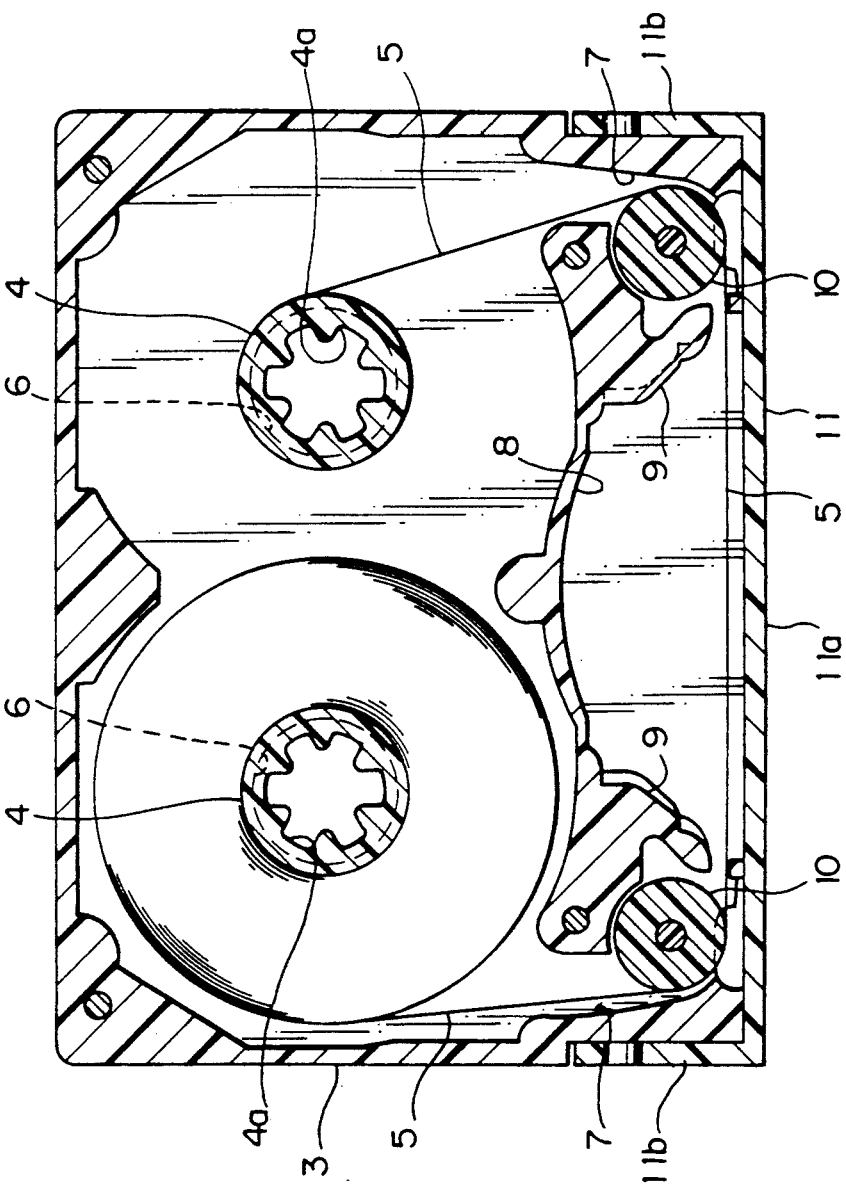

CASSETTE EJECTING MECHANISM OF A TAPE PLAYER

BACKGROUND OF THE INVENTION

1. Field of the Invention

This invention relates to a novel ejecting mechanism for a cassette tape player.

2. Description of the Prior Art

In video tape players, rotary head type audio tape players or the like, the tape is driven and the magnetic head is rotated to perform recording and playback in a so-called helical scan system. In this system, a magnetic tape is wrapped substantially in helical form with a predetermined wrapping angle around the outer periphery of a head drum supporting a rotary magnetic head. To simplify the construction and speed up mechanical changeover from the stop mode to an operation mode, part of the head drum may be positioned within a tape cassette except when loading or ejecting the tape cassette into or out of the cassette loading portion.

An example of such a tape player is depicted in FIGS. 1A and 1B. In FIGS. 1A and 1B the tape player is generally indicated by reference character a. A cassette holder b is supported for pivotal movement between an ejecting position, (depicted by an alternate long and two short dashes line) for insertion and removal of a tape cassette c, and a loading position, (shown by a solid line) for loading the tape cassette c in a cassette loading portion. The cassette holder b is biased for movement toward the ejecting position and, when moved to the loading position, is locked by lock means. A head drum d is supported on a slidable plate e located rearward of the cassette holder b at the loading position. The head drum d is moved among a first position, (shown by an alternate long and short dash line), a second position (shown by a solid line slightly rearward of the first position), and a third position (shown by an alternate long and two short dashes line) rearward of the second position. The head drum d supports a rotary magnetic head (not shown) which is movable along the outer periphery of the head drum d.

The tape player also has a pivotal head drum moving lever f having one end linked to the slidable plate e. When the head drum moving lever f is pivoted, the slidable plate e is moved in a front/rear direction with the head drum d.

The tape player also has a head drum withdrawal lever g. Rearward depression of this lever causes the head drum moving lever f to pivot rearward.

To eject the tape cassette c, the head drum withdrawal lever g is moved rearward. This causes the head drum moving lever f to move to its retracted position (shown by an alternate long and two short dashes line in FIG. 1A). This, in turn, causes head drum d to be withdrawn rearwardly out of the pivotal path of the tape cassette c held on the cassette holder b. After the head drum d is withdrawn from the interior of the tape cassette c, the locking of the cassette holder b is released to permit the cassette holder b to move to the ejecting position. Then, to load cassette c into the loading position, the cassette holder b is moved along with the tape cassette c to the loading position. By subsequently moving the head drum moving lever f to a stop position (shown by a solid line), a front end of the head drum d is inserted in a head drum accepting concave portion h. This causes a magnetic tape i to be wrapped around the outer periphery of the had drum d at a small wrapping angle. This state is the stop mode. Fast-forwarding, rewinding, search and the like are carried out in this state. Recording and playback are effected by moving the head drum moving lever f to an advanced position (shown by an alternate long and short dash line) and increasing the wrapping angle of the magnetic tape i onto the head drum d.

Movement of the head drum moving lever f from the stop position to the advanced position is effected by pressing a play lever (not shown). Rearward movement of the head drum withdrawal lever g is performed by pressing an ejecting lever (not shown).

Because the magnetic tape i is wrapped onto the head drum d by simply moving the head drum d, a particular tape loading mechanism is not needed for drawing the magnetic tape i out of the tape cassette c and wrapping it onto the head drum d. This significantly simplifies the construction. In addition, because magnetic tape i is already wrapped onto the head drum d in the stop mode, search or other tape motion can be immediately started without moving the head drum d. Further, because the moving distance of the head drum d from the stop mode to a record/play mode for recording or playback is small, recording or playback can be started quickly.

In the tape player a, movement of the cassette holder b to the ejecting position, i.e. the releasing of the lock of the cassette holder in the loading position, must be timed to occur after the head drum d is withdrawn from the interior of the tape cassette c.

For this purpose, it may be possible to use a particular unlocking operating means for unlocking the cassette holder b and withdrawing the head drum d from the interior of the tape cassette c, and to use means provided among these respective operating means for controlling the respective timing of these operations. That is, control means could be employed to permit the unlocking operating means to be operated after operation of the head drum withdrawal operating means. However, this complicates the construction and requires much labor for the ejecting operation.

Moreover, with such an arrangement, the head drum d must be held outside the tape cassette c by locking the head drum moving lever f in the retracted position when the cassette holder b is located at any position other than the loading position. However, the lock must be released when the cassette holder b is moved to the loading position. If such particular means is used for effecting such control the construction of the tape player a is not simplified as much as would be expected by omitting the tape loading mechanism.

OBJECTS AND SUMMARY OF THE INVENTION

It is, therefore, an object of the invention to provide a cassette ejecting mechanism for a tape player in which locking and unlocking of the cassette holder in and from the loading position, as well as locking of the head in its withdrawn position, from the interior of the tape cassette, can be reliably carried out by means of the cassette holder and an intermediate lever alone. With this arrangement, the construction is not complicated, and the ejecting operation can be executed very easily.

According to an aspect of the invention, a cassette ejecting mechanism of a tape player is provided comprising:

A chassis; a cassette holder for holding a tape cassette having a tape, the cassette holder having a locking portion and a lockable portion; a mechanism for pivotally mounting the cassette holder on the chassis for movement about a pivotal axis between an ejecting position permitting insertion and removal of the tape cassette and a loading position permitting the tape to be driven; a first biasing mechanism for biasing the cassette holder toward the ejecting position; a head base for supporting a magnetic head for recording or reproducing information signals on or from the tape; a mechanism for mounting the head base on the chassis for movement between retracted and engaged positions relative to the loading position of the cassette holder, the magnetic head being located outside of the tape cassette when the head base is in the retracted position and the cassette holder is in the loading position, and at least part of the magnetic head being located inside the tape cassette when the head base is in the engaged position and the cassette holder is in the loading position; a driving lever for moving the head base between the retracted and the engaged positions; an operating lever movable with respect to the chassis for initiating movement of the cassette holder toward the ejecting position; an intermediate lever movable in response to movement of the operating lever; and a second biasing mechanism for biasing the head base toward the engaged position; a lock member on the intermediate lever being engageable with the lockable portion of the cassette holder for preventing movement of the cassette holder toward the ejecting position by the first biasing mechanism when the head base is in the engaged position; and the locking portion of the cassette holder being engageable with the lock member of the intermediate lever for preventing movement of the head base toward the engaged position by the second biasing mechanism when the cassette holder is in the ejecting position.

The above, and other, objects, features and advantages of the present invention will become readily apparent from the following detailed description thereof which is to be read in connection with the accompanying drawings.

BRIEF DESCRIPTION OF THE DRAWINGS

FIGS. 1A and 1B show an example of the head drum portion of a prior art tape player, FIG. 1A being a partly cut-off fragmentary plan view and FIG. 1B being a partly cut-off fragmentary side elevation;

FIGS. 19A to 19D present enlarged plan views of the driving lever and play lever portion of the operating mechanism, showing successively from 19A to 19D, movement of the play lever, responsive expansion of a limiter spring, rearward movement of the sublever to cause the head base to move forwardly, movement of the head drum moving lever to its advanced position, and movement of the main lever to its mode establishing position;

FIG. 20B is a cross sectional view taken along the XX—XX line of FIG. 19D;

FIGS. 21A and 21B present fragmentary vertical cross-sectional views showing ejecting motion successively from FIG. 21A to FIG. 21B;

FIG. 23 is a horizontal cross-sectional view of the tape cassette; and

DETAILED DESCRIPTION OF THE PREFERRED EMBODIMENTS

Figure 1A:
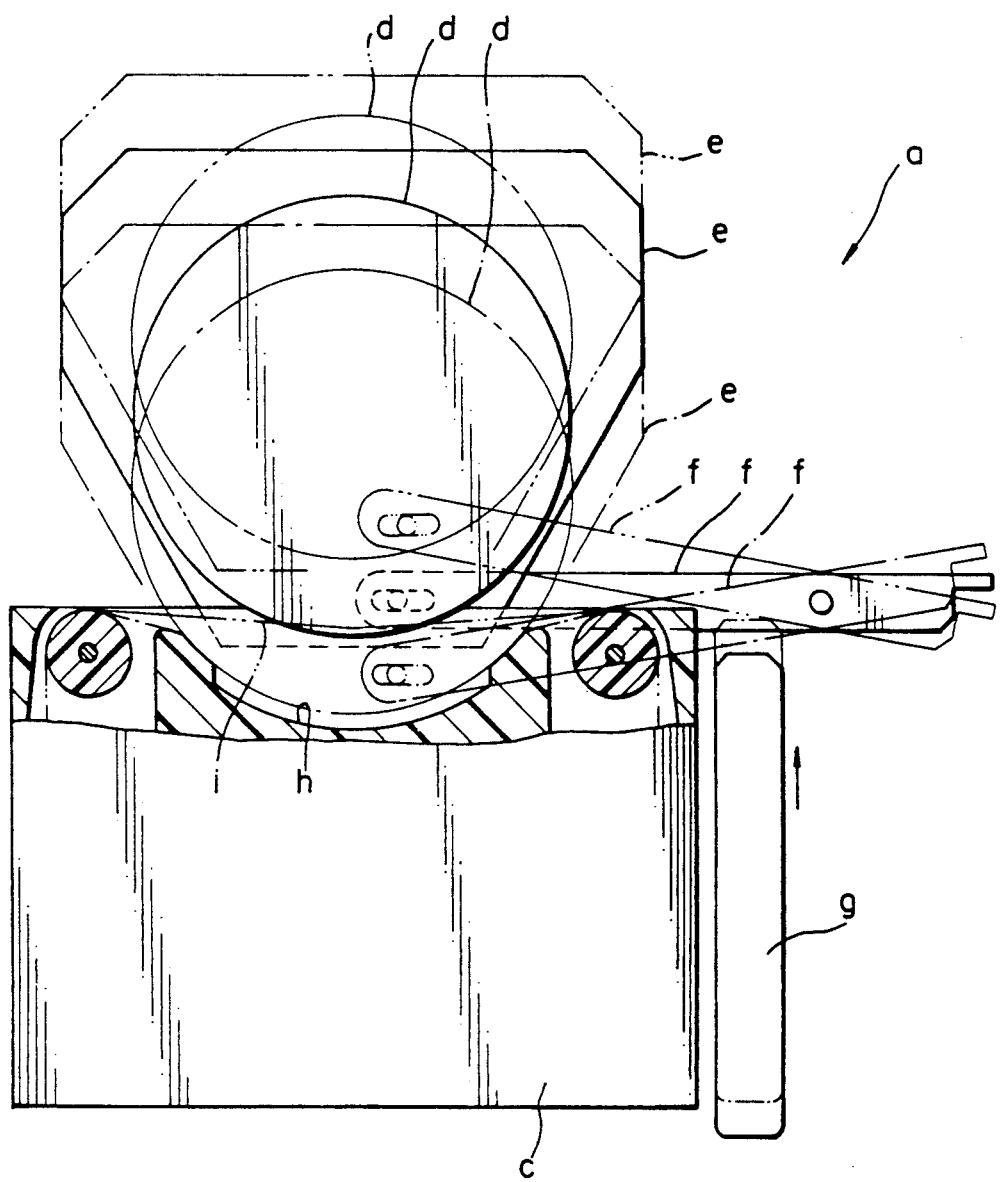

A cassette tape player ejecting mechanism according to a preferred embodiment of the invention will now be described with reference to the drawings (FIGS. 2 to 24).

I. Tape Cassette (FIGS. 2, 4 to 6, 9 to 11, and 21 to 24

Turning first to FIGS. 2, 4 to 6, 9 to 11, and 21 to 24 and initially to FIGS. 22, 23, 24A and 24B thereof, there will now be described a tape cassette 2 used in a tape player 1 in accordance with a preferred embodiment of the present invention.

Tape cassette 2 has a cassette casing 3 in the form of a rectangular, flat box elongated in the right and left direction, as seen from the upper side.

Two tape reels 4 are rotatably enclosed in the cassette casing 3 and a magnetic tape 5 is wrapped around the tape reels 4.

Two through holes 6 are disposed in each of two walls of the cassette casing 3. Engaging holes 4a disposed in the tape reels 4 are accessible from the exterior via through holes 6.

Tape exits 7 are disposed in both the right and left end portions of the front surface of the cassette casing 3. The magnetic tape 5 is led out of the tape exits 7 to the exterior of the cassette casing 3, extending along the front surface of the cassette casing 3.

A head drum accepting concave portion 8 is disposed in the front end portion of the cassette casing 3. The head drum accepting concave portion 8 is opened forwardly but covered at its upper and lower sides.

An inner surface of the head drum accepting concave portion 8 has contact surfaces 9 close to the right and left ends of the head drum accepting concave portion 8. When a head drum 21, to be described later, engages the contact surfaces 9, the contact surfaces 9 positionally fix it with respect to the tape cassette 2.

Pinch rollers 10 are rotatably supported in positions within the tape exits 7 close to the head drum accepting concave portion 8. Thus the magnetic tape 5 bridges over the front surface of the cassette case 3, while wrapped around the pinch rollers 10, so as to extend across the front face of the head drum accepting concave portion 8. The portion of the tape cassette 2 where the magnetic tape 5 extends across the front face of the head drum accepting concave portion 8 is called a tape bridging surface.

The tape cassette 2, includes a front lid 11 made of a flexible elastic synthetic resin. The front lid 11 has a unitary body including a cover portion 11a which covers the front face of the cassette casing 3 and side members 11b which extend rearward from both ends of the cover portion 11a. Distal end portions of the side members 11b are pivotally mounted to the right and left side walls of the cassette casing 3 to permit pivotal movement of the front lid 11 between a closed position (as shown in FIG. 24A) and alternative open positions (as shown by a solid line and an alternate long and two short dashes line in FIG. 24B).

Figure 24A:
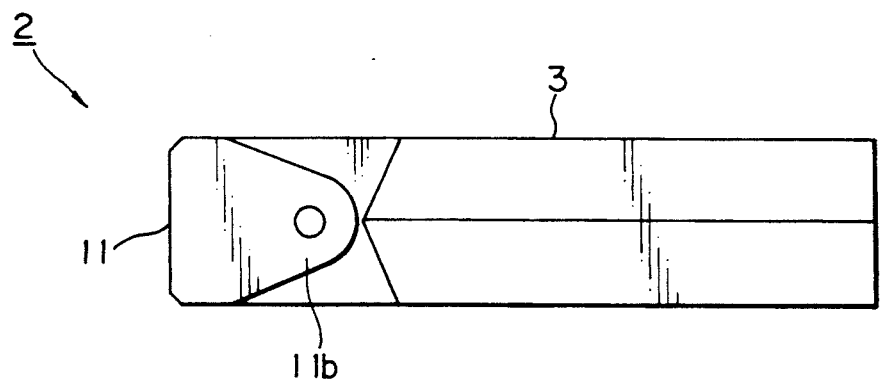
FIG. 24 presents side elevations of the tape cassette with its front lid in a closed position in FIG. 24A and in an open position in FIG. 24B.
Figure 24B:
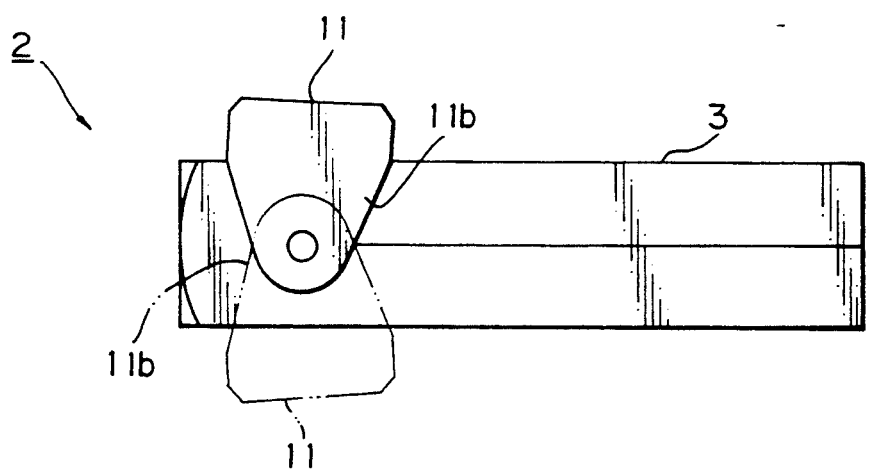

As can be seen from the side views of FIGS. 24A and 24B, the distance from a rotational fulcrum of the front lid 11 to the upper or lower edge of the front surface of the cassette casing 3 is slightly larger than the distance from the rotational fulcrum to the cover portion 11a. Therefore, when the front lid 11 moves between the two positions, the cover portion 11a receives a forward stretching force as it passes through the upper or lower edge of the front surface of the cassette casing 3. In doing so, the entire cover portion 11a distorts in the form of a gentle arc, and can thus pass over the upper or lower end of the cassette casing 3. At the closed position, the front lid 11 is click-locked in place.

II. Overview of the Tape Player (FIGS. 2 to 6 and 9 to 11)

Figure 2:
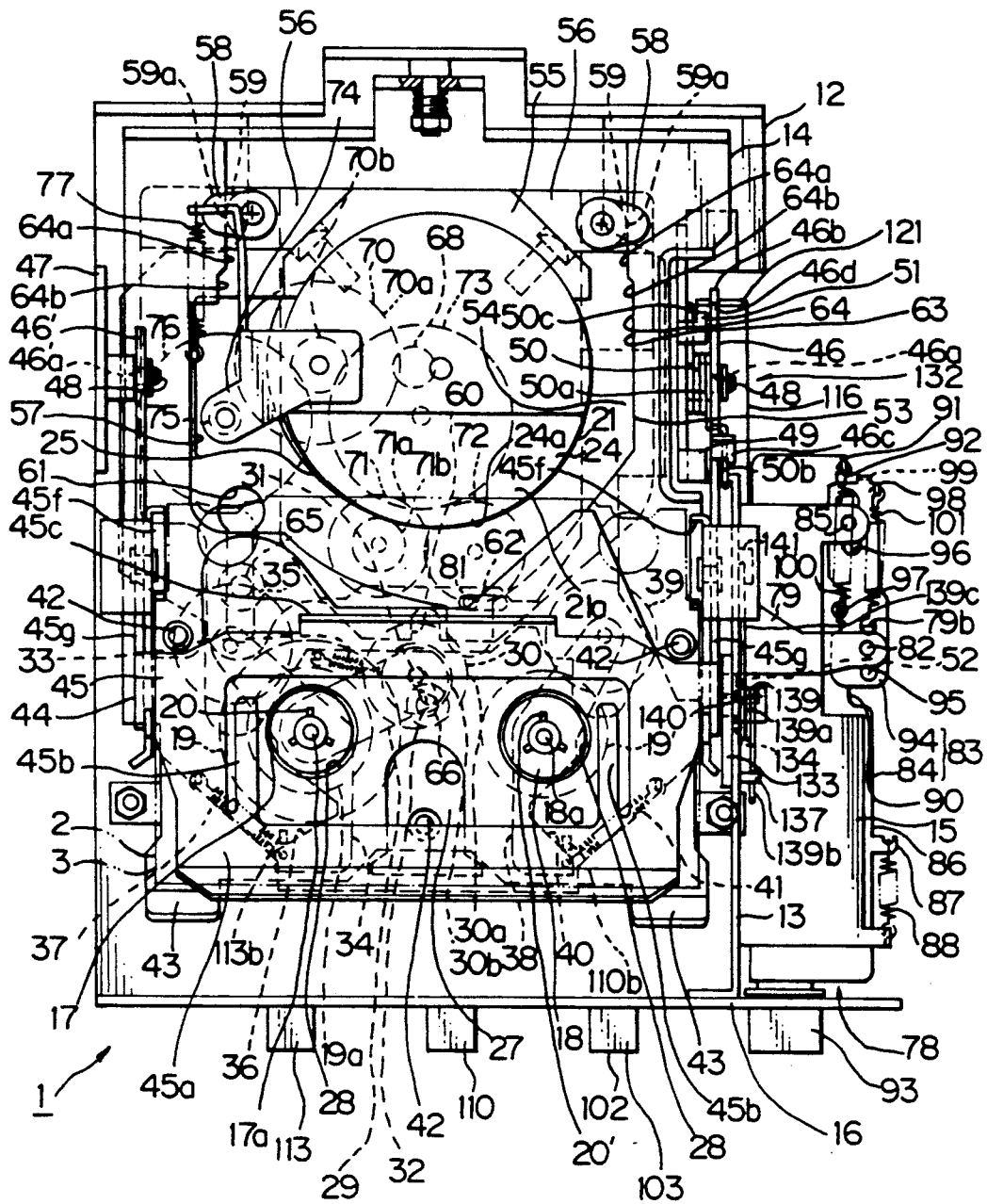
FIG. 2 is a plan view of the entire tape player to which the invention has been applied.
Figure 3:
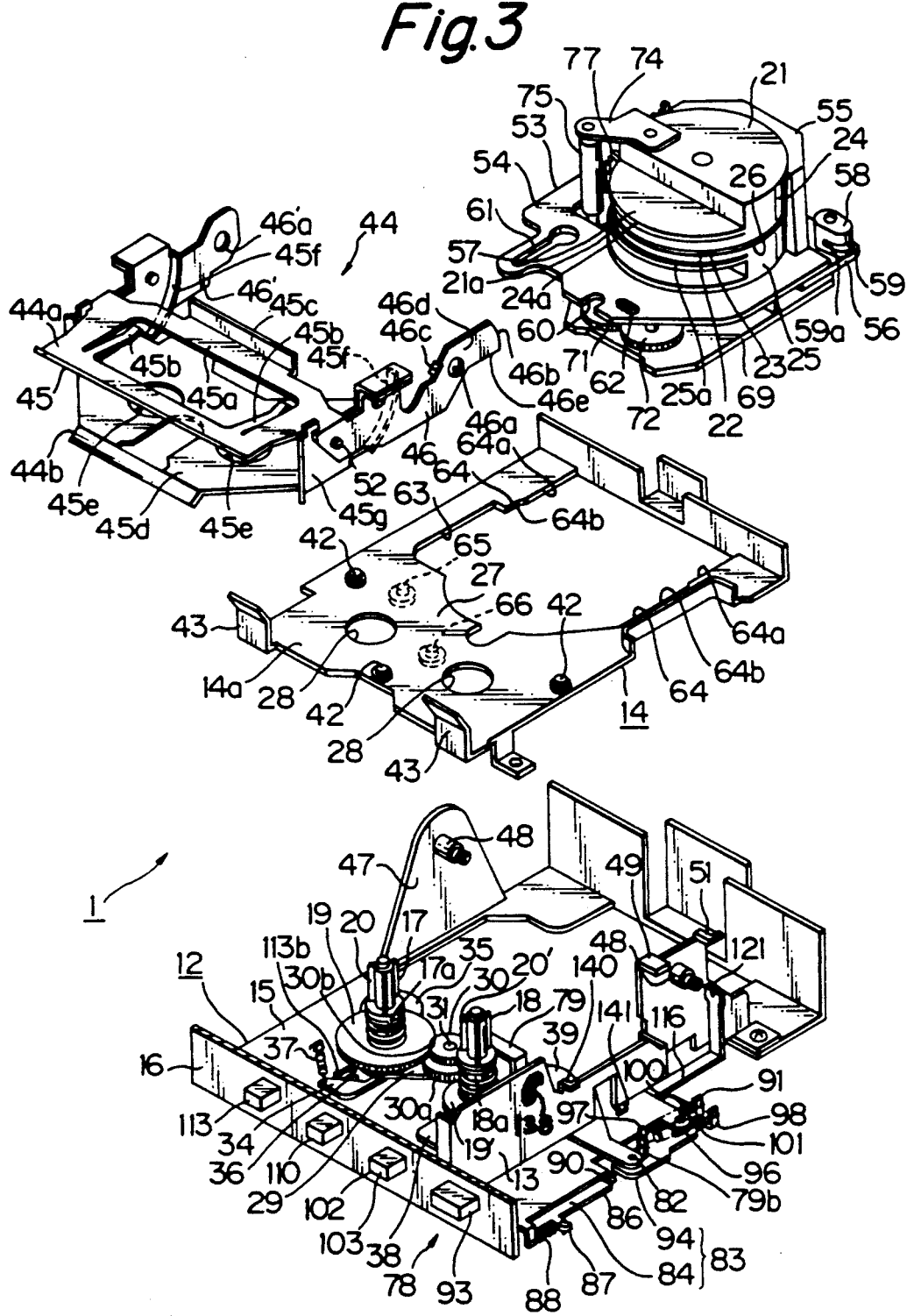
FIG. 3 is an exploded perspective view of the tape player.

Referring now to FIGS. 2 to 6 and 9 to 11, and initially to FIGS. 2 and 3 thereof, the tape player 1 will now be described.

The tape player 1 has a main chassis 12 and a side wall 13 fixed on its upper surface. A subchassis 14 is also fixed to the main chassis 12.

The main chassis 12 has a substantially rectangular outer shape which is elongated in the front/rear direction. As used in this specification for describing directions with respect to the tape player 1, the terms "front" or "forward" refers to the direction toward the bottom of FIG. 2, "rear" or "back" refers to the direction toward the top of FIG. 2, "left" refers to the direction toward the left end of FIG. 2, and "right" refers to the direction toward the right end of FIG. 2. The main chassis 12 includes a front wall 16 upstanding from a front end edge of its bottom plate 15. A large part of the bottom plate 15 is opened except for its front end and left end portions. A side wall 13 extends in the front-/rear direction and is fixed in position slightly to the left of the right side edge.

The subchassis 14 rests on the upper surface of the main chassis 12 to the left of side wall 13 and parallel to the bottom plate 15.

Reel bases 17 and 18 are separately rotatably mounted in right and left positions of the front part of the bottom plate 15. Reel bases 17 and 18 include reel base gears 19, 19' and reel engaging shafts 20, 20' which are in frictional engagement with each other. Accordingly, when the reel base gears 19, 19' are rotated by a drive system, to be described later, frictional force between the reel base gears 19, 19' and the reel engaging shafts 20, 20' rotates reel engaging shafts 20, 20'.

The front part of the subchassis 14 serves as a cassette loading portion for loading the tape cassette 2.

A head drum 21 is supported for back and forth movement on the upper surface of the subchassis 14.

The head drum 21 is of an inner drum rotation type. Magnetic heads 23 are supported on the outer peripheral surface of an inner drum 22 and located in a space 26 provided between upper and lower drums 24 and 25. In front part 21a of the head drum 21, the spacing between the upper surface of the upper drum 24 and the lower surface of the lower drum 25 is slightly less than the upper to lower width of the head drum accepting concave portion 8. In the same front part 21a, confronting edges 24a and 25a bulge slightly outwardly from the upper edge of the upper drum 24 and the lower edge of the lower drum 25. The spacing between the confronting edges 24a and 25a is slightly larger than the width of the magnetic tape 5.

Figure 9:
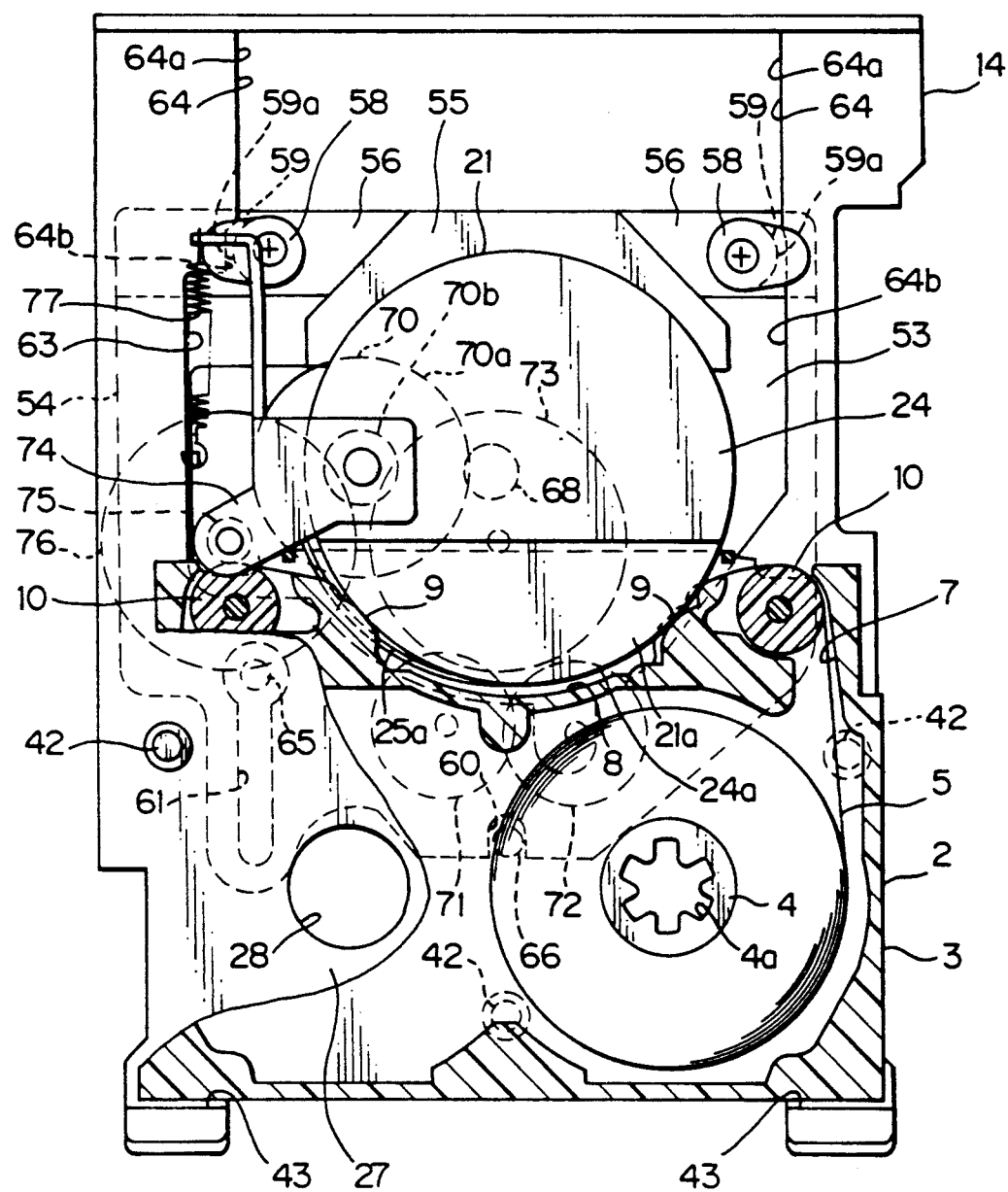
FIG. 9 is a partly cut-away plan view showing the head drum in a first position.
Figure 10:
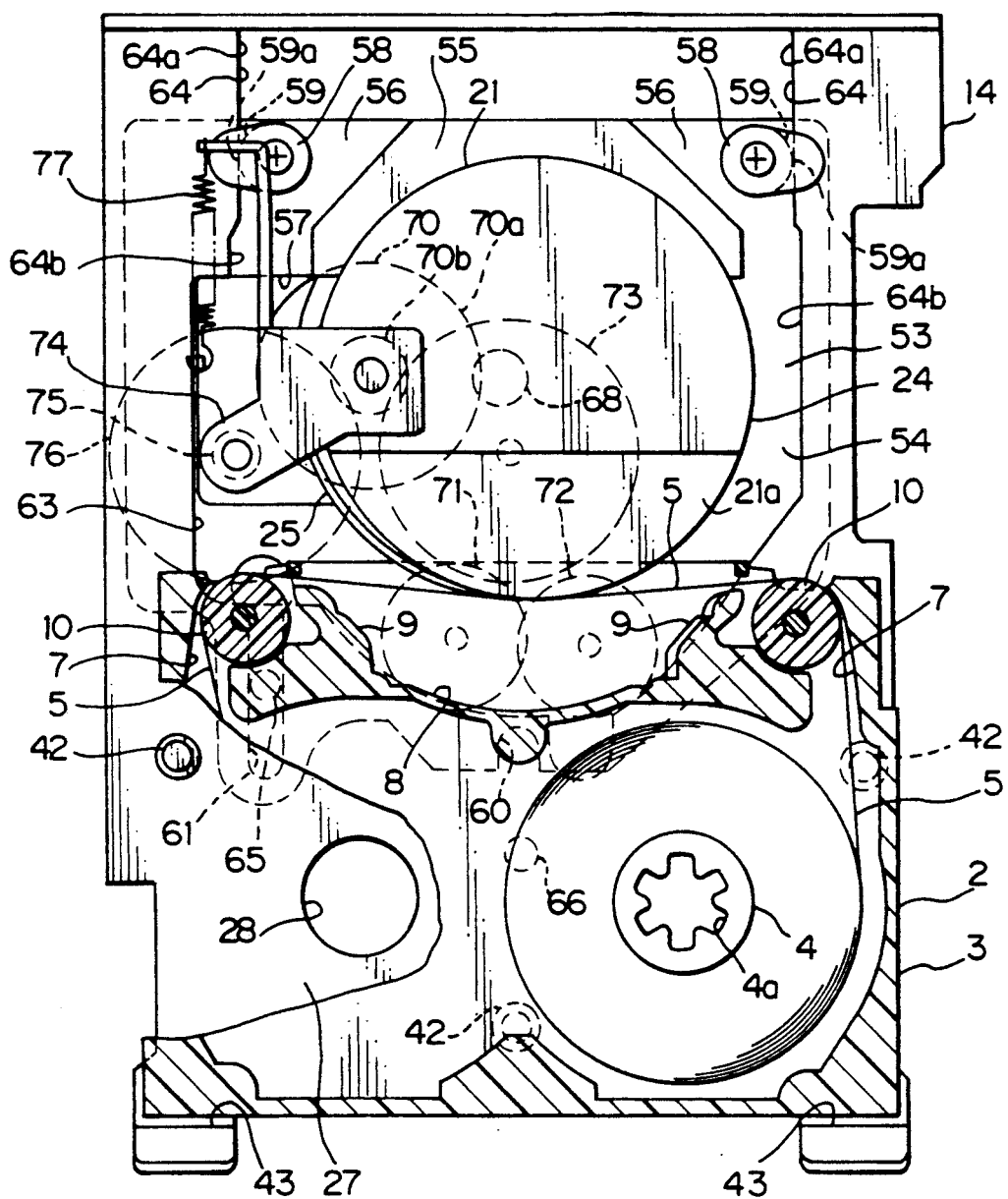
FIG. 10 is a partly cut-away plan view showing the head drum in a second position.
Figure 11:
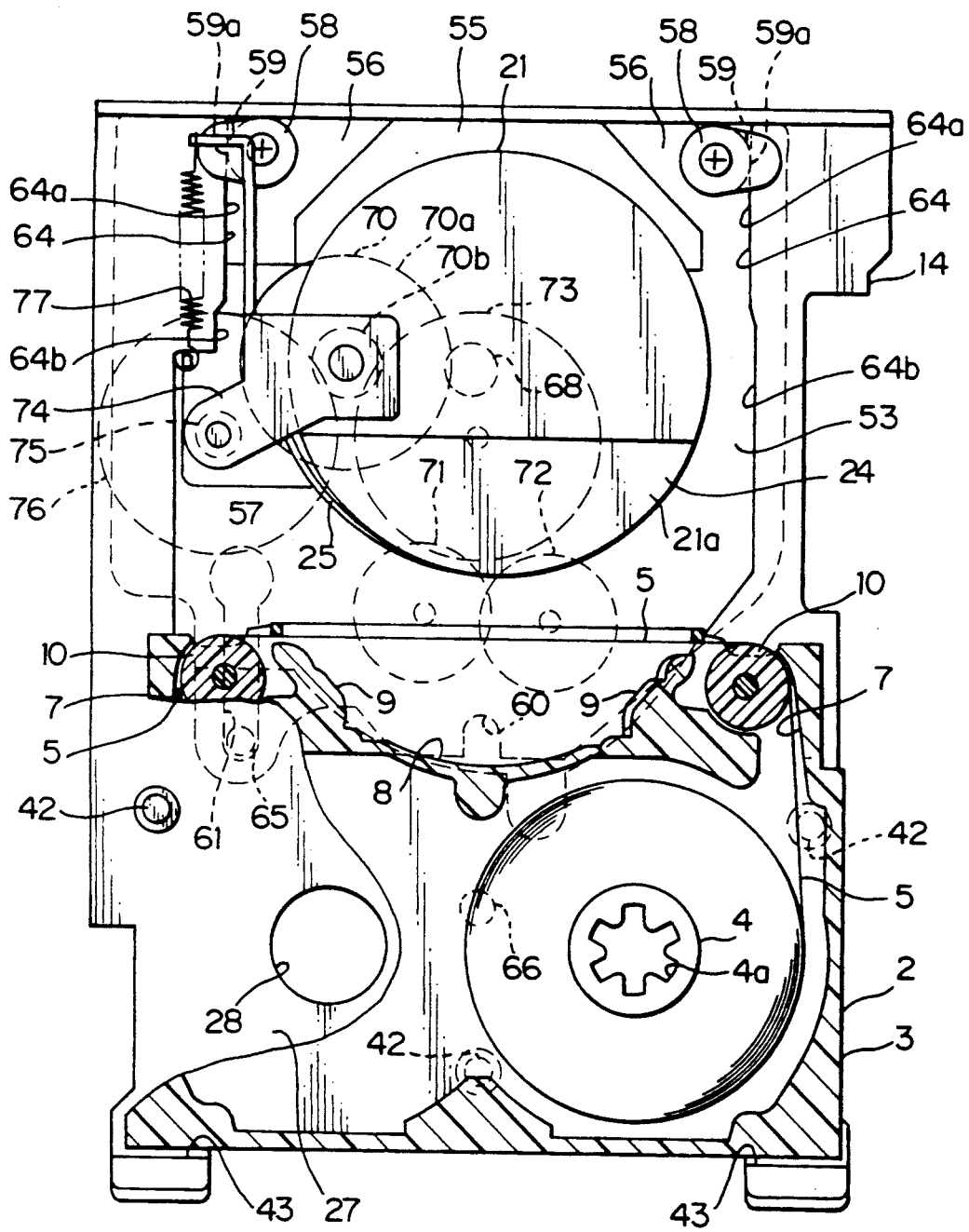
FIG. 11 is a partly cut-away plan view showing the head drum in a third position.

Thus the head drum 21 is movable from a first position, where most of the front part 21a of the head drum 21 is within the head drum accepting concave portion 8, as shown in FIG. 9, to a second position, where the front part 21a is slightly within the head drum accepting concave portion 8, as shown in FIG. 10, and finally to a third position, where the head drum 21 is fully outside the head drum accepting concave portion 8, as shown in FIG. 11.

When the head drum 21 is located in the first position, the magnetic tape 5 is depressed into the interior of the head drum accepting concave portion 8 and is wrapped around the head drum 21 over a predetermined wrapping angle. In this configuration, the magnetic heads 23 can perform recording and/or playback of the magnetic tape 5.

When the head drum 21 has moved to the second position, the magnetic tape 5 is wrapped around the head drum 21 over a smaller wrapping angle than when recording and/or playback is performed. Fast-forwarding, rewinding or search of the magnetic tape 5 can be selectively performed in this state.

To load or eject tape cassette 2 from the tape player 1, the head drum 21 is moved to the third position. Unless the tape cassette is being loaded or ejected, or the tape is being run in the record and/or playback mode, the head drum 21 is held in the second position.

III. Cassette Loading Portion (FIGS. 2, 3 and 12 to 17

A cassette loading portion 27 will now be described with reference to FIGS. 2, 3 and 12 to 17.

The upper surface of an approximately front half of the subchassis 14 serves as the cassette loading portion 27.

Front part 14a of the subchassis 14 has through holes 28, spaced in the right/left direction, through which the reel engaging shafts 20 and 20' of the reel bases 17 and 18 extend upwardly beyond the subchassis 14.

A play gear arm 29 has a proximal end pivotally supported by a support shaft 17a of the reel base 17. A play gear 30, which is a unitary member including a large gear 30a and a small gear 30b, is rotatably supported at the pivotal end of the arm 29. The small gear 30b always engages the reel base gear 19 of the reel base 17.

The lower end of the support shaft 31 of the play gear 30 extends downward beyond the main chassis 12 and terminates in a restriction hole 32 formed in the main chassis 12. The restriction hole 32 is arc-shaped and encircles the support shaft 17a to limit the pivotal range of movement of the arm 29.

A tension spring 33 is interposed between the play gear arm 29 and the main chassis 12 to bias the play gear arm 29 in the counterclockwise direction, as seen from the upper side. Therefore, the play gear arm 29 is held in a position where the lower end of the support shaft 31 engages the rear end of the restriction hole 32 unless the pivotal end of the arm 29 is urged away from the back of the restriction hole 32.

A FF (i.e. fast forward) gear arm 34 is provided having an intermediate portion pivotally supported by the support shaft 17a. A FF gear 35 is pivotally supported by the FF gear arm 34, and always engages the small gear 19a of the reel base gear 19. A left side edge of a front part of the FF gear 34 has a cam edge 36 which is inclined to the left progressively in the forward direction.

A tension spring 37 is interposed between the FF gear arm 34 and the main chassis 12 to bias the FF gear arm 34 in the clockwise direction as seen from the upper side.

A REW (i.e. rewind) gear arm 38 is provided which has an intermediate portion pivotally supported by a support shaft 18a of the reel base 18. REW gear arm pivotally supports, at a rear end thereof, a REW gear 39 which always engages the reel base gear 19'. A right side edge of a front part of the REW gear arm 38 has a cam edge 40 which is inclined to the right progressively in the forward direction.

A tension spring 41 is interposed between the REW gear arm 38 and the main chassis 12 to bias the REW gear arm 38 in the counterclockwise direction, as seen from the upper side.

Arms 34 and 38 are pivoted by manipulation of an operation lever, to be described later, to establish the FF, search or REW mode in which the reel bases 17 and 18 are rotated at a high speed.

Cassette support pins 42 extend upwardly from the subchassis 14 so that when the tape cassette 2 is put on them, it is positionally fixed in the up and down direction.

Restriction members 43 extend upwardly from right and left ends of the front end edge of the subchassis 14 so that when the rear surface of the tape cassette 2 is put onto the cassette loading portion 27, the rear edge of tape cassette 2 engages them to positionally fix the tape cassette 2 in the front/rear direction. Note that the rear portion of tape cassette 2 is adjacent the front portion of the tape player 1.

IV. Cassette Holder (FIGS. 2 to 6)

Referring now to FIGS. 2 to 6, 15 to 17 and 21, and initially to FIGS. 3 to 6 thereof, the cassette holder 44 will now be described.

Cassette holder 44 is a unitary member including upper and lower metal frame members 44a and 44b, respectively.

The cassette holder 44 has a main part which includes a cassette holding portion 45. The cassette holding portion 45 has a flat and rectangular shape as seen from the front side. It has an upper plate 45a in the form of a transversely elongated rectangular frame, as seen from the upper side. Pressing members 45b extend rearward from the front edge of an opening of the upper plate 45a at positions close to the right and left ends thereof. Rear ends of the pressing members 45b are sloped down lower than the lower surface of the upper plate 45a, with their extreme ends being slightly curved upwardly.

A lid turn-back member 45c extends upwardly from the middle portion of the rear edge of the upper plate 45a.

A bottom plate 45d is provided having two through holes 45e spaced in the right/left direction.

Guide members 45f, made by inwardly draw-processing rear end edges of side plates 45g provided in the lower frame member 44b, are provided. The front face of each guide member 45f defines an arc which is inclined progressively upward in the rear direction, starting from its lower end.

Arms 46 and 46' project rearwardly and are attached to the upper frame member 44a in surface contact with and outside the side plates 45g. Arms 46 and 46' have support holes 46a and 46'a at positions close to their rear ends. The right arm 46, extending rearward beyond the rear end of the left arm 46', is slightly longer than the left arm 46'. The rear end 46b of the right arm 46 is in the form of an arc concentric with the center of the support hole 46a. The right arm 46 has a spring engaging portion 46c on its upper side edge slightly forward of the support hole 46a.

A support wall 47 extends upwardly from the left side edge of the bottom plate 15 of the main chassis 12. Support shafts 48 project from an upper end of the support wall 47 and a corresponding portion of the side wall 13, and are pivotally inserted in the support holes 46a, 46'a disposed in the arms 46, 46' of the cassette holder 44.

In this manner, the cassette holder 44 is supported by the main chassis 12 for pivotal movement substantially in the up and down direction. Cassette holder 44 can thus move between the ejecting position shown in FIG. 21B, where its right arm 46 is inclined with its front end held high, and the upper end of the front end of right arm 46 is engaged by the bottom of a stopper 49 formed along the upper end of the side wall 13, and the loading position shown in FIG. 21A, where the cassette holding portion 45 is held substantially in a horizontal orientation, close to the cassette loading portion 27 of the subchassis 14.

Figure 4:
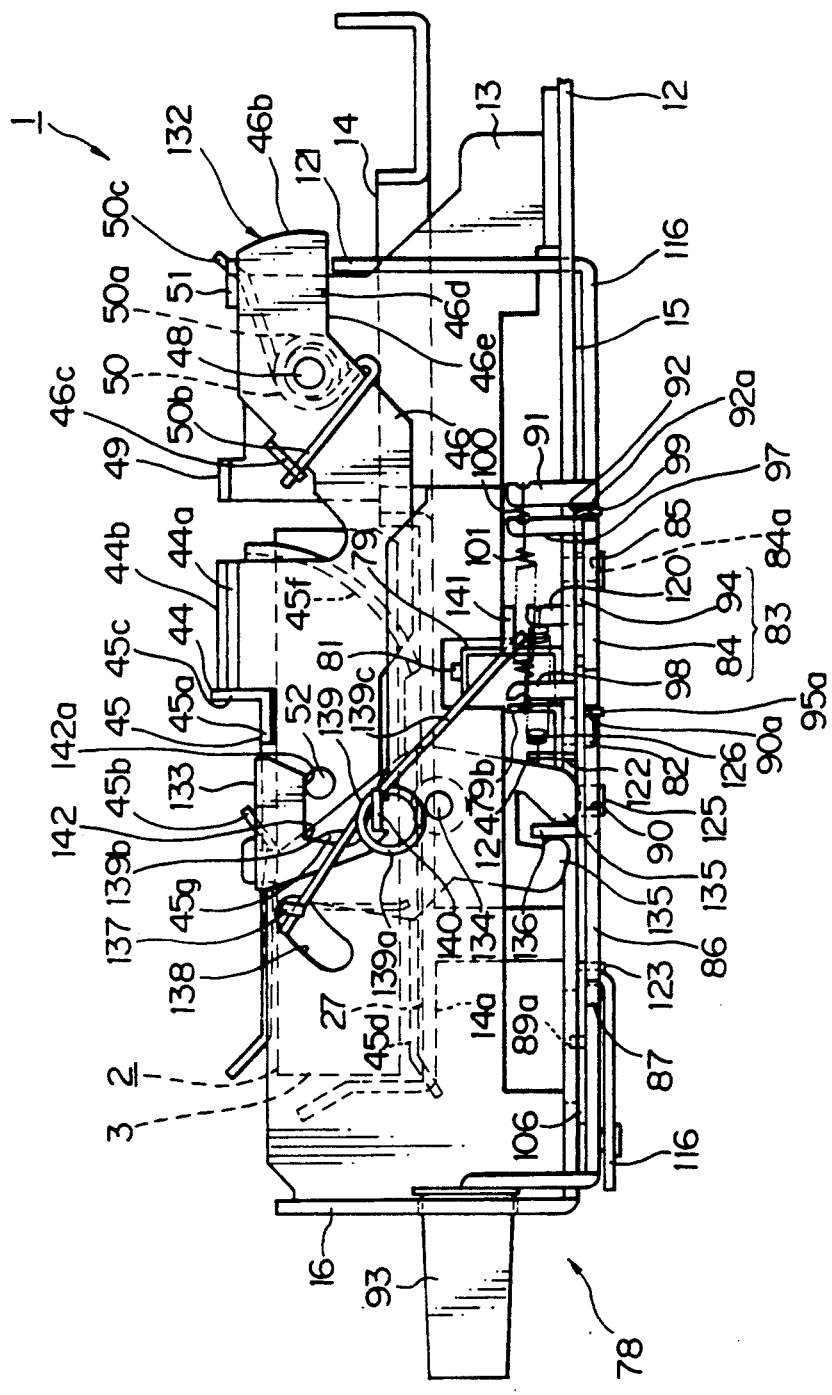
FIG. 4 is a fragmentary side elevation of the tape player showing the cassette holder in its loading position.

As can be best seen in FIG. 4, a scissor-shaped spring 50 having a coil portion 50a is engaged around the right one of the support shafts 48. The spring 50 has one arm 50b whose distal end resiliently engages a front bottom of a spring confronting portion 46c formed on the arm 46 of the cassette holder 44. Spring 50 has another arm 50c whose distal end engages a rear bottom of a spring confronting portion 51 formed on the upper end of the side wall 13.

The stretching force of the scissor-shaped spring 50 gives the cassette holder 44 a clockwise pivotal force, as seen from its right side, i.e., a moving force in the direction of the ejecting position. When the cassette holder 44 has been moved to the loading position, a head drum withdrawal lever, to be described later, prevents clockwise movement of the rear end 46d (hereinafter called a portion to be locked) of its right arm 46. At the same time, a lock pin 52 extending horizontally rightward from the right side plate 45g of the cassette holding portion 45 is locked by a holder pressing lever, to be described later, to hold the cassette holder 44 in place.

V. Tape Cassette Loading and Unloading (FIGS. 5 and 6)

Figure 5:
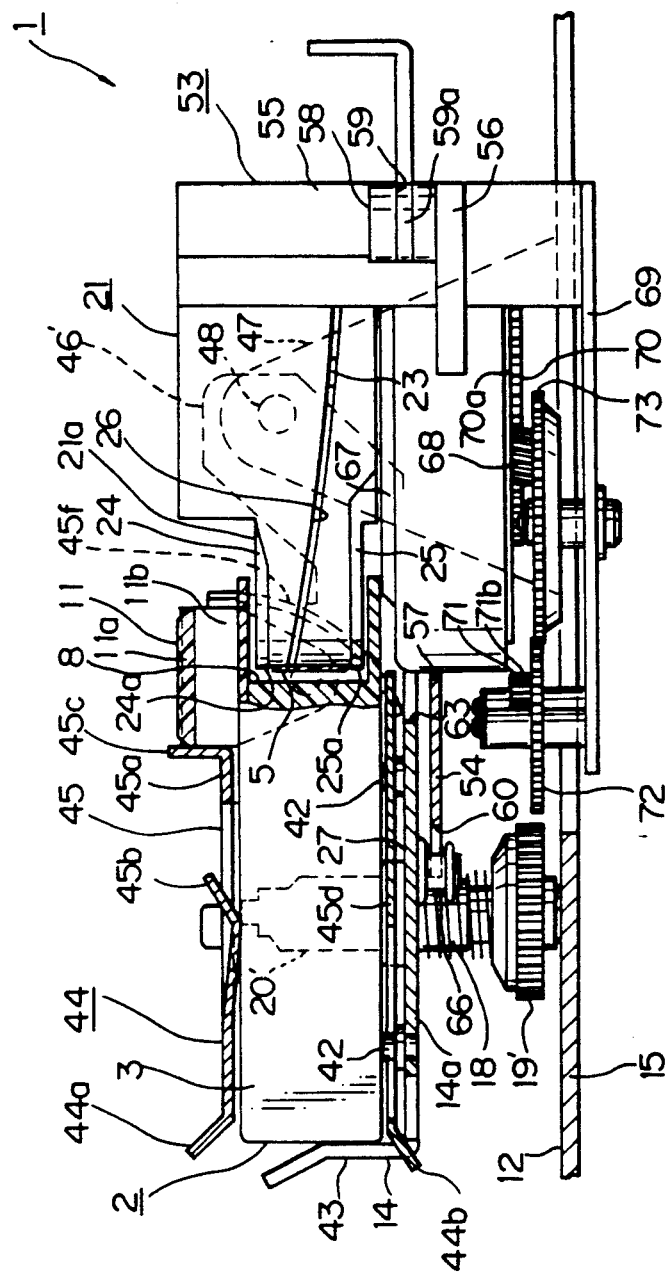
FIG. 5 is a fragmentary vertical cross-sectional view of the tape player showing the cassette holder in the loading position.
Figure 6:
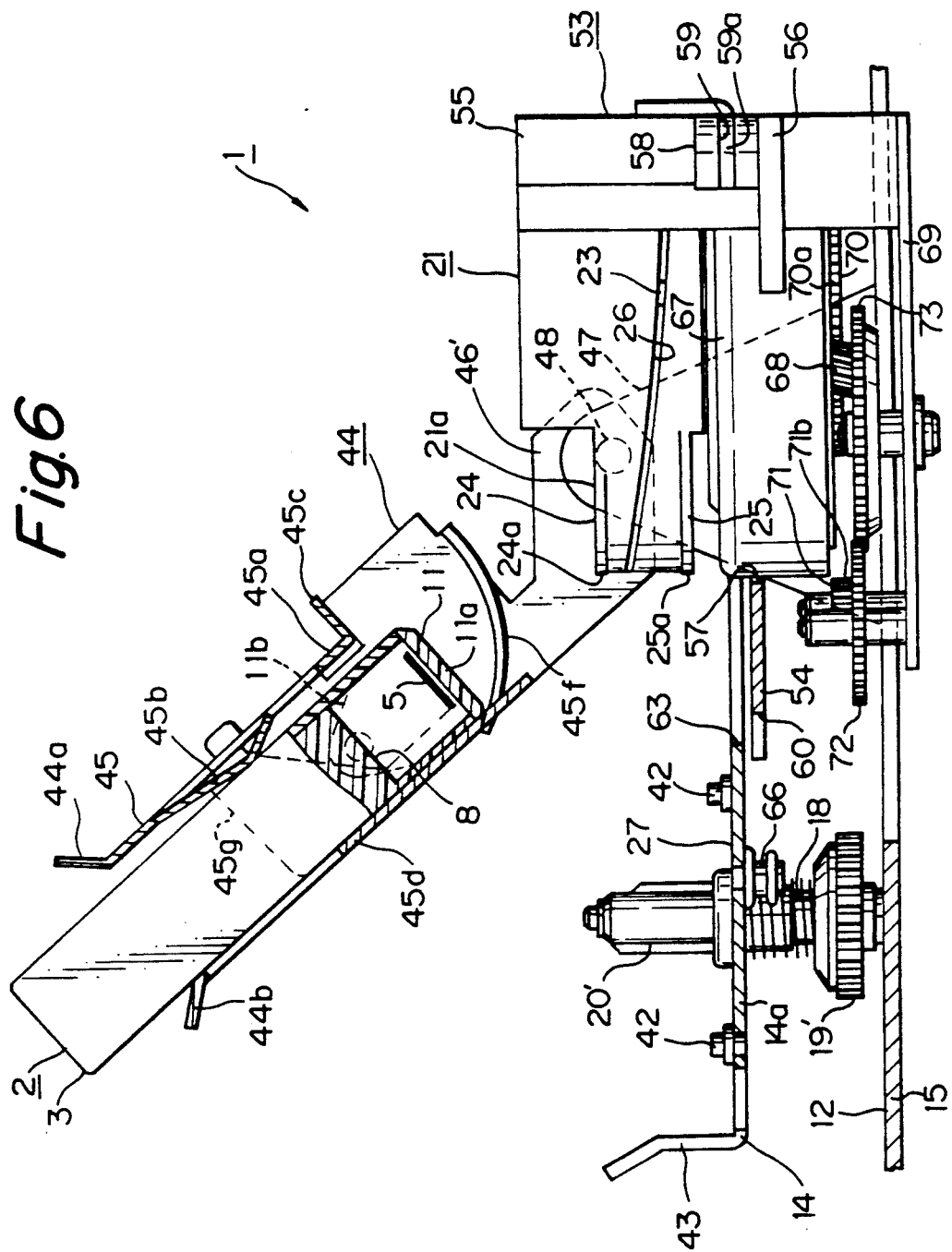
FIG. 6 is a fragmentary vertical cross-sectional view of the tape player showing the cassette holder in its ejecting position.
Figure 7:
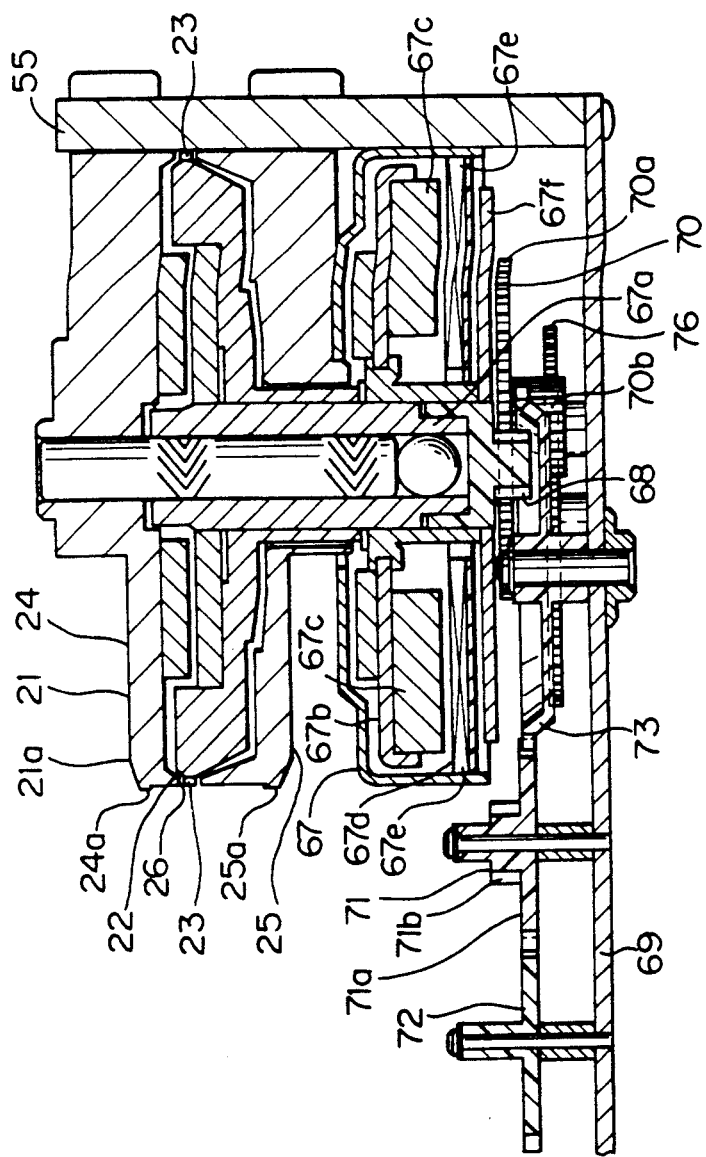
FIG. 7 is a vertical cross-sectional view of a portion of the tape player, showing a cross section of a head drum and gears on a gear base.
Figure 8:
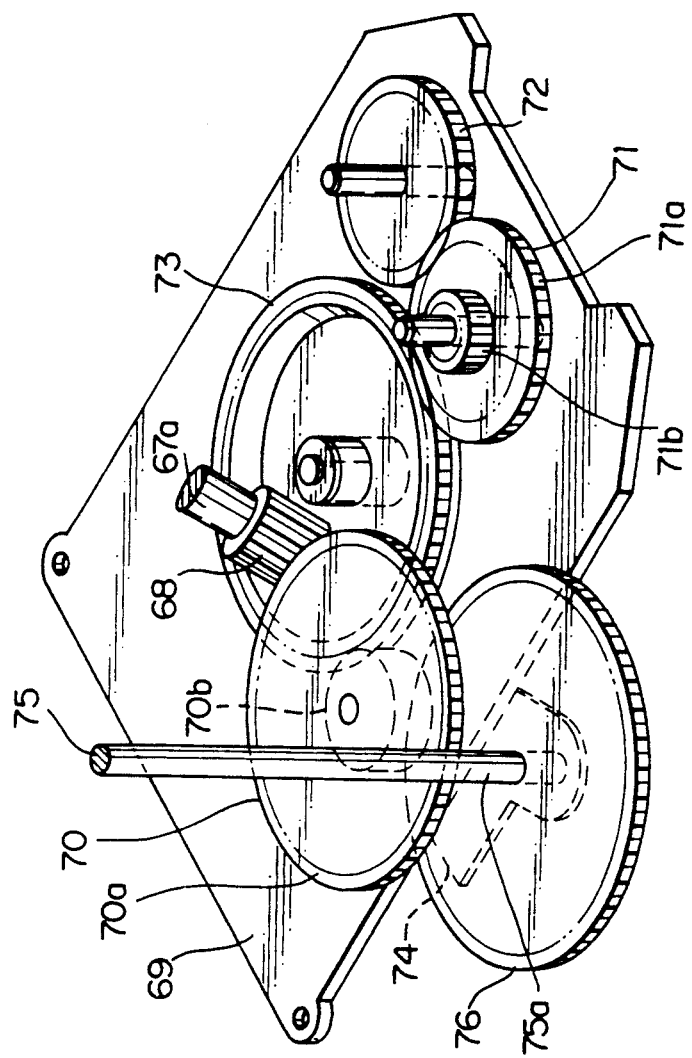
FIG. 8 is a perspective view of the gear base.

Turning now to FIGS. 5 and 6, the loading and unloading of tape cassette 2 will be described.

The tape cassette 2 is loaded by first progressively inserting it into the cassette holding portion 45 of the cassette holder 44 located at the ejecting position. As this is done, both ends of the lower part of the front lid 11 come into engagement with the guide portions 45f. As the tape cassette 2 is further inserted into the cassette holding portion 45, both ends of the front lid 11 are lifted by the guide portions 45f to guide the front lid 11 into the open position. When the front lid 11 reaches the open position, the lid turnback member 45c is opposed to and almost contacts the front lid 11. Conversely, when the tape cassette 2 is removed from the cassette holding portion 45, the front lid 11 is pressed by the lid turn-back member 45c of the cassette holding portion 45 and returned back to the closed position.

When the cassette holder 44 carrying the tape cassette 2 in its cassette holding portion 45 is pivoted downward, the tape cassette 2 is loaded in the cassette loading portion 27. More specifically, the reel engaging shafts 20, 20' of the reel bases 17, 18 engage the engage holes 4a of the tape reels 4 of the tape cassette 2 through the insertion holes 45e of the cassette holder 44, and the lower surface of the cassette casing 3 is put on the upper ends of the cassette supporting pins 42.

Note that the cassette holder 44 reaches the loading position just after the tape cassette 2 is put on the cassette supporting pins 42 so that when the tape cassette 2 is fully in the loading position, it is pressed between the cassette supporting pins 42 and the pressing members 45b of the cassette holder 44.

VI. Support of the Head Drum (FIGS. 2, 3 and 5 to 17)

Referring now to FIGS. 2, 3 and 5 to 17, the support of the head drum will be described.

A head base 53 is supported on the subchassis 14 so that it is movable in the front/rear direction.

The head base 53 includes a slide plate 54 and a support block 55 fixed to the slide plate 54.

Coupling members 56 extend outwardly from middle portions with respect to the up and down direction of the right and left side surfaces of the support block 55.

The slide plate 54 has a large, rearwardly open cutout 57. Right and left rear ends of the slide plate 54 are fixed to the coupling members 56 of the support block 55.

Slide bridges 58 are fixed to the upper surfaces of the coupling members 56 and are made of a low friction synthetic resin. The slide bridges 58 have slide grooves 59 opened to the exterior.

A notch 60 is disposed in the center of the front edge of the slide plate 54. Notch 60 is elongated in the front-/rear direction and opened to the front end. An elongated guide hole 61 is disposed in a front end portion of the slide plate 54 and is elongated in the front/rear direction.

An elongated engage hole 62 is disposed at a position close to the front end of the slide plate 54 and is elongated in the right/left direction.

A hole 63 is formed in the subchassis 14 to occupy the major part of an approximately rear half thereof. Both side edges 64 of the hole 63 are used as guide edges and extend in parallel relationship in the front/rear direction. Rear end portions 64a of the guide edges 64 project slightly inwardly. The spacing between the rear end portions 64a is substantially equal to the spacing between deep end surfaces 59a of the slide grooves 59 formed in the slide bridges 58. The spacing between portions 64b of the guide edges 64, excluding the rear end portions 64a, is slightly larger than the spacing between the deep end surfaces 59a.

The slide grooves 59 of the head base 53 slidably engage the guide edges 64 of the subchassis 14. A guide pin 65, attached to and upstanding from the subchassis 14, slidably engages the elongated guide hole 61 of the head base 53. A guide pin 66 attached to and upstanding from the subchassis 14, slidably engages the slit 60 of the head base 53. In this manner, the head base 53 is supported on subchassis 14 so that it is movable in the front/rear direction.

When the slide grooves 59 engage the rear end portions 64a of the guide edges 64, the guide edges 64a are substantially in contact with the deep end surfaces 59a of the slide grooves 59. As a result, the head base 53 is firmly held without substantial right and left oscillation. However, when the slide grooves 59 engage the portions 64b of the guide grooves 64, a slight gap between the portions 64b and the deep end surfaces 59a of the slide grooves 59 permits slight oscillation of the head base 53 in the right/left direction.

The head drum 21 is of a motor-incorporated type, with a drum motor shown at 67, and is fixed to the head base 53.

Head drum 21 includes an inner drum 22 which rotates with a rotor 67b by means of rotational shaft 67a. A rotor magnet 67c is secured to the rotor 67b. A stator 67d is opposed to the rotor 67b. A stator coil 67e confronts the rotor magnet 67c. A back yoke 67f is fixed to the rotational shaft 67a in confrontation with the rotor 67b via the stator 67d.

A drive gear 68 is formed integrally with the lower end of the rotational shaft 67a extending downward beyond the lower end of the motor 67.

A gear base 69 whose rear end is fixed to the lower end of the support block 55 of the head base 53 is provided to support the drive gear 68, and other gears in a manner to be described.

A transfer gear 70 is rotatably supported on the gear base 69 at the left side of the drive gear 68. The transfer gear 70 is a unitary member which includes a large gear 70a and a small gear 70b. The large gear 70a engages the drive gear 68.

Relay gears 71 and 72 are rotatably supported in right and left adjacent positions and held in mutual meshing engagement. The relay gear 71 is for the FWD (i.e. forward) system whereas the relay gear 72 is for the REW system. The FWD relay gear 71 is a unitary member including a large gear 71a and a small gear 71b in a concentrical arrangement.

The large gear 71a of the FWD relay gear 71 and the small gear 70b of the transfer gear 70 are linked by a link gear 73 rotatably supported on the gear base 69.

As a result, when the drum motor 67 rotates, the two relay gears 71 and 72 are rotated in opposite directions;

the FWD relay gear 71 in the counterclockwise direction and the REW relay gear 72 in the clockwise direction, as seen from the upper side.

A capstan arm 74, whose proximal end is pivotally supported on the gear base 69 and the upper drum 24 and whose rotational shaft is coaxial with the rotational shaft of the transfer gear 70, rotatably supports a capstan 75 at a pivotal end portion of the capstan arm 74. A capstan gear 76 is fixed to a shaft 75a extending under the capstan 75 and engages the small gear 70b of the transfer gear 70. The capstan 75 is thus rotated by rotation of the drum motor 67.

A tension spring 77 is interposed between the capstan arm 74 and the head base 53 to give the capstan arm 74 a counterclockwise pivotal force, as seen from the upper side.

With reference to FIG. 9, when the head drum 21 is in its first position with the head base 53 moved forwardly into the tape cassette 2, the slide grooves 59 of the head base 53 are in engagement with the portions 64b of the guide grooves 64 and can, thus, slightly oscillate in the right/left direction. Therefore, the head drum 21 correctly positions itself by pressing the confronting edges 24a and 25a of the head drum 21 onto the contact surfaces 9 of the tape cassette 2.

The confronting edges 24a and 25a of the head drum 21 are pressed onto the contact surfaces 9 of the cassette case 3 by means of the stretching force of a limiter spring, to be referred to later.

As the head drum 21 is moved to the first position, the capstan 75 engages one of the pinch rollers 10 of the tape cassette 2 on the part of the tape reel 4 which is in engagement with the reel engaging shaft 20 of the takeup reel base 17, via the magnetic tape 5. Thereafter, during further movement of the head drum 21 to the first position, the capstan 75 is retracted slightly, relative to head drum 21, causing the tension spring 77 to expand. As a result, the capstan 75 is pressed onto the pinch roller 10, via the magnetic tape 5, by the stretching force of the expanded tension spring 77.

VII. Operating Mechanism (FIGS. 2 to 4 and 12 to 21)

Referring now to FIGS. 2 to 4 and 12 to 21, the operating mechanisms 78 will be described. Operating mechanism 78 includes a play lever for establishing the play mode for recording and/or playback of the magnetic tape 5; a FF lever for establishing the FF mode for fast-forwarding or search of the magnetic tape 5; a REW lever for establishing the REW mode for rewinding the magnetic tape 5; a lock lever for locking either of the mode establishing levers in its mode establishing position; a release lever having both a function of releasing the lock effected by the lock lever to establish the stop mode and a function of executing cassette ejection; a head drum moving lever, movable by the play lever or similar means to move the head base 53; a head drum withdrawal lever for moving the head base 53 to the third position upon loading and ejection of the tape cassette 2; an intermediate lever for selectively switching the two functions of the release lever; and a limiter spring and a return spring for the play lever.

A. Head Drum Moving Lever (FIGS. 2, 4 and 12 to 21)

Referring now to FIGS. 2, 4 and 12 to 21 the head drum moving lever will be described.

The head drum moving lever 79 is elongated in the right/left direction and has an intermediate portion offset in the form of a channel, as seen from the right side. Thus, its left half portion is located in a slightly higher position than its right half portion. A portion of the drum moving lever 79 that is slightly to the right of its intermediate portion is pivotally supported by a support shaft 80 to the right side of the bottom plate 15 of the main chassis 12 A coupling pin 81 is upstanding from the left end portion of the head drum moving lever 79 and slidably engages the elongated engage hole 62 of the head base 53. Therefore, pivoting the head drum moving lever 79 causes the coupling pin 81 to move substantially in the front/rear direction. This, in turn, causes the head base 53, i.e., the head drum 21, to move in the front/rear direction.

A portion to be pressed 79a is provided in the front edge of the head drum moving lever 79 at a central but slightly left position of the pivotal support point of the head drum moving lever 79. Further, the head drum moving lever 79 is provided with, at its right end portion, a vertically standing stopper pin 82 and an upstanding spring engage member 79b.

Figure 12:
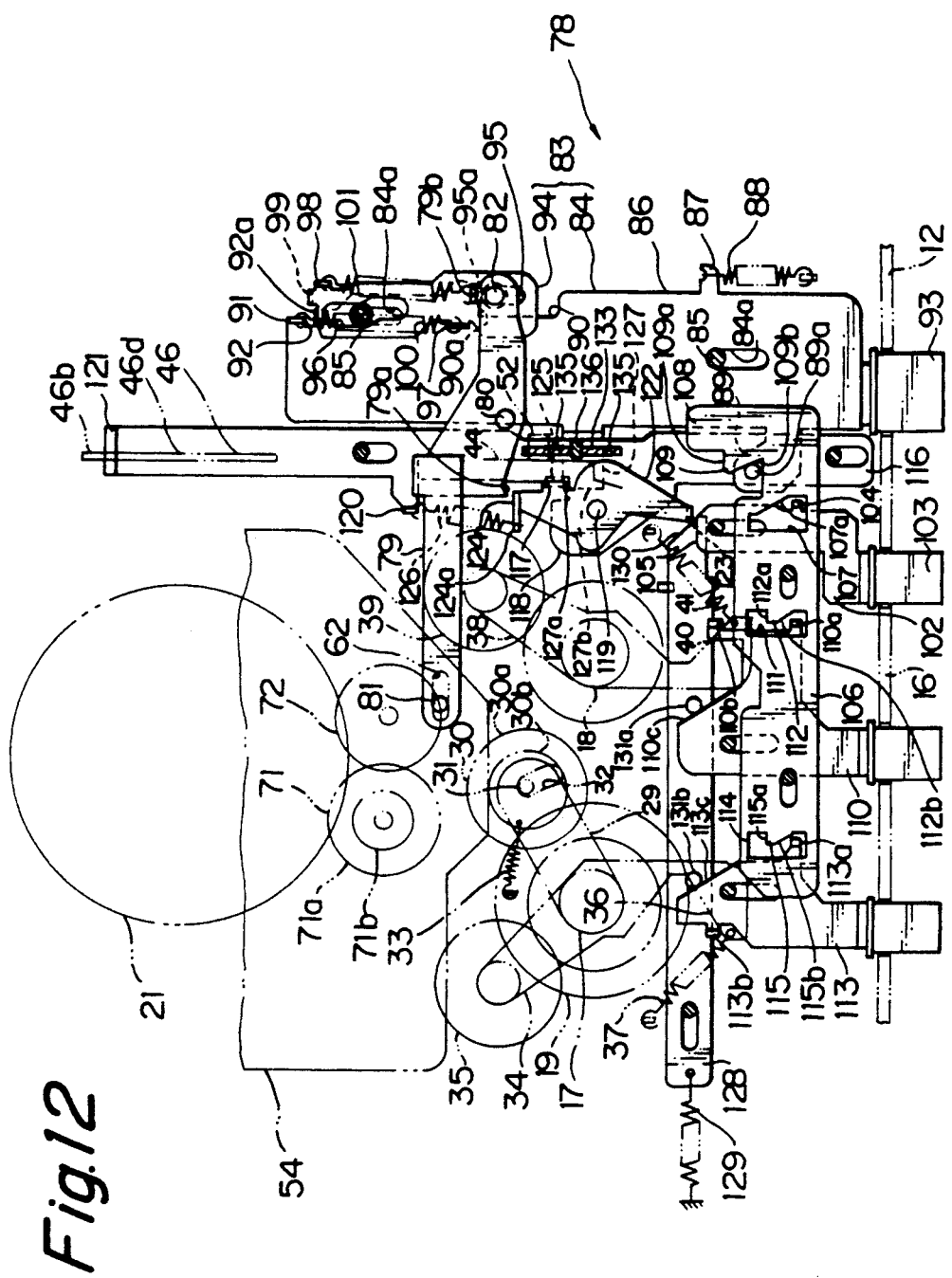
FIGS. 12 to 17 are plan views of the operating mechanism of the tape player showing various operating states: a stop mode in FIG. 12, a play mode in FIG. 13, a state with a release lever depressed from the play mode in FIG. 14, an ejecting state in FIG. 15, a REW (i.e. rewind) mode in FIG. 16 and a FF (i.e. fast forward) mode in FIG. 17.
Figure 13:
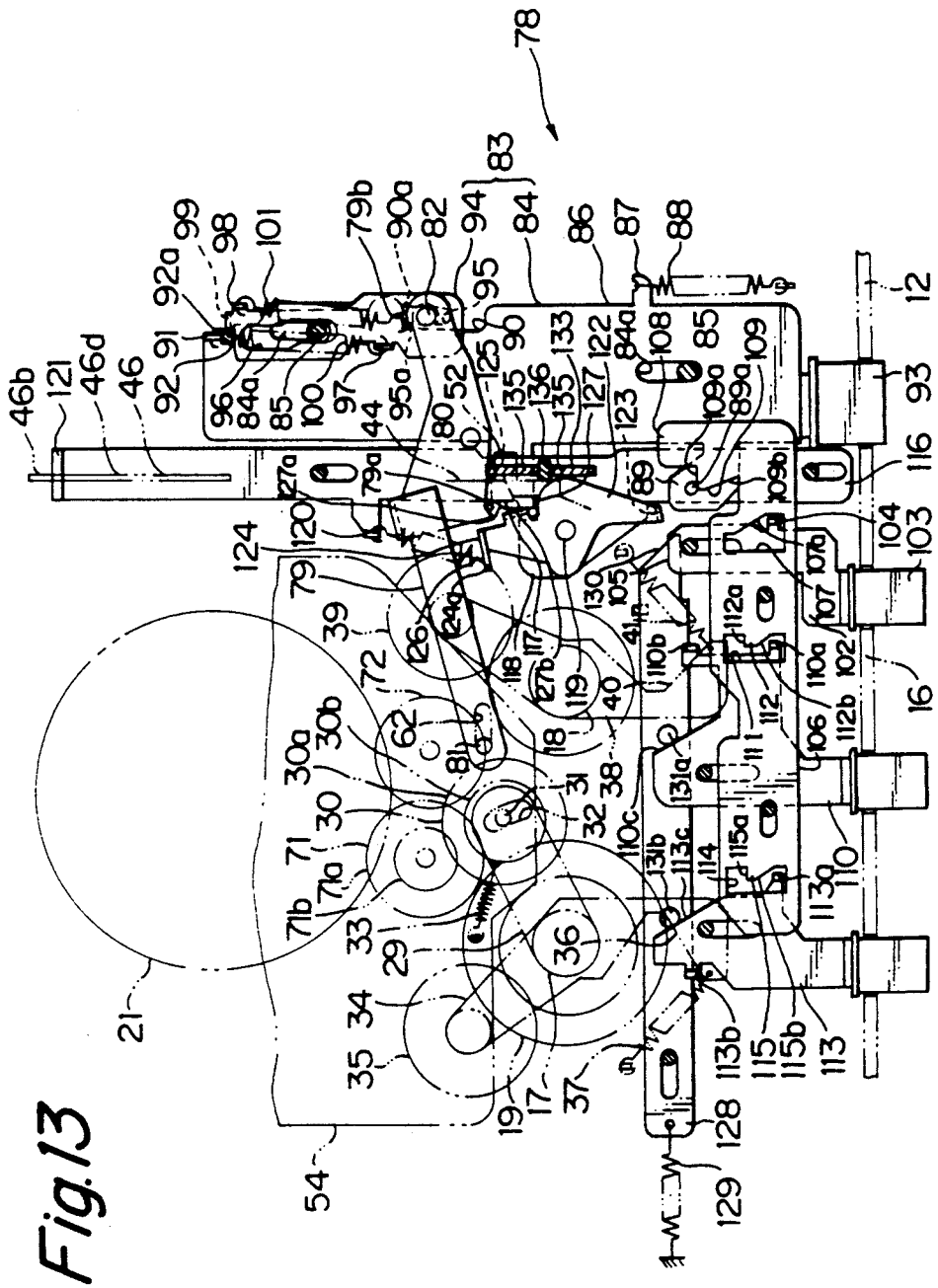

The head drum moving lever 79 is urged by the play lever to the advanced position, shown in FIG. 13, for establishing the play mode. It is urged by the release lever, described later, or by similar means, to move to the retracted position, shown in FIG. 15, so that the cassette holder 44 can be moved to the ejecting position. At other times the head drum moving lever 79 is held in the stop position shown in FIG. 12. The head drum 21 is held in the second position when the head drum moving lever 79 is in the stop position. Movement of the head drum moving lever 79 to the advanced position causes the head drum 21 to move to its first position, and movement of the head drum moving lever 79 to the retracted position causes the head drum 21 to move to its third position.

B. Play Lever, Limiter Spring, Return Spring and Others (FIGS. 2 to 4 and 12 to 10)

With reference to FIGS. 2 to 4 and 12 to 20 the construction and operation of the play lever, limiter spring and return spring will now be described.

The play lever 83 has a main lever 84 slidable in the front/rear direction, a sublever 94 supported by the main lever 84 to be slidable in the front/rear direction and pivotal to a substantial degree in the right/left direction, a tension return spring 100 interposed between t he main lever and the sublever, and others. A tension limiter spring 101 is interposed between the sublever and the head drum moving lever 79 to press the head drum 21 to the cassette casing 3.

The main lever 84 is in the form of a plate and is elongated in the front/rear direction. The main lever 84 has elongated guide holes 84a provided in its rear right portion and its front end portion. Elongated guide holes 84a are elongated in the front/rear direction and slidably accept guide pins 85, which are vertically standing from right end portions of the bottom plate 15 of the main chassis 12 so as to be slidable over a limited length in the front/rear direction. Further, the main lever 84 is biased forwardly by a tension spring 88 which couples a spring engage member 87 extending from a front end portion of the right side edge 86 of the main lever 84 and the main chassis 12. Thus, main lever 84 is held in the non-depressed position shown in FIG. 12 unless it is urged rearward against the force of tension spring 88.

An arm member 89 extends substantially to the left from a front end position of the main lever 84 and has a pin to be locked 89a upstanding from its distal end.

A cutout 90 elongated in the front/rear direction is provided slightly rearward of a middle point of the right side edge 86. The rear end portion of the right edge 86 is located slightly to the left of the remainder, and a spring hook member 91 extends upward therefrom. Further, a substantially channel-shaped engage cutout 92 is provided in a portion of the right side edge 86 continuously extending forwardly from the spring hook member 91. A front edge 92a of the engage cutout 92 behaves as a coupling edge for coupling an engage member of the sublever 94 to be described later.

A push button 93 is attached to the front end of the main lever 84.

Note that the lower end of the stopper pin 82 of the head drum moving lever 79 is located in the cutout 90.

The sublever 94 has a length longer than one third that of the main lever 84. The sublever 94 has an elongated engage hole 95 in its front end portion extending in the front/rear direction and an elongated guide hole 96 in a rear position of the sublever 94. A confronting member 95a extends vertically from the rear end of the elongated engage hole 95. A middle portion 96a of the elongated guide hole 96 is slanted to the right progressively in the forward direction while the remainder extends in the front/rear direction. A spring hook member 97 is upstanding from a front end portion of the left side edge of the sublever 94. A spring hook member 98 is upstanding from a rear end portion of the right side edge of the sublever 94. An engage member 99 is vertically standing from the rear edge of the sublever 94.

The sublever 94 lies over the upper surface of the main lever 84, its elongated guide hole 96 slidably accepting the rear one of the two guide pins 85 supporting the main lever 84 and its elongated engage hole 95 slidably accepting the stopper pin 82 of the head drum moving lever 79. The tension return spring 100 bridges the front spring hook member 97 of the sublever 94 and the spring hook member 91 behind the main lever 84. The tension limiter spring 101 bridges the rear spring hook member 98 of the sublever 94 and the spring hook member 79b of the head drum moving lever 79.

Note that the tension force of the return spring 100 is less than the tension force of the limiter spring 101.

The tension force of the limiter spring 101 applied between the right end portion of the head drum moving lever 79 and the sublever 94 causes the confronting member 95a of the sublever 94 to engage the stopper pin 82 of the head drum moving lever 79 substantially in the front/rear direction. The tension force of the return spring 100 applied to the m in lever 84 and the sublever 94 causes the confronting member 95a of the sublever 94 to engage the rear edge 90a (hereinbelow called a confronting edge) of the cutout 90 of the main lever 84.

As seen in FIGS. 12 and 19A, when the main lever 84 is in the non-depressed position, the head drum moving lever 79 is held in the stop position, and the head drum 21 is held in the second position.

In this state, the elongated guide hole 96 of the sublever 94 accepts the guide pin 85 in a portion of the guide hole 96 between the middle portion 96a and the rear portion 96b. Furthermore, in this state, the engage member 99 of sublever 94 approaches the engage edge 92a of the engage cutout 92 of the main lever 84 from the right so that it is in substantial alignment with the engage edge 92a.

2. Pressure Contact and Release of the Head Drum
(FIGS. 19A to D and 20)

Figure 19C:
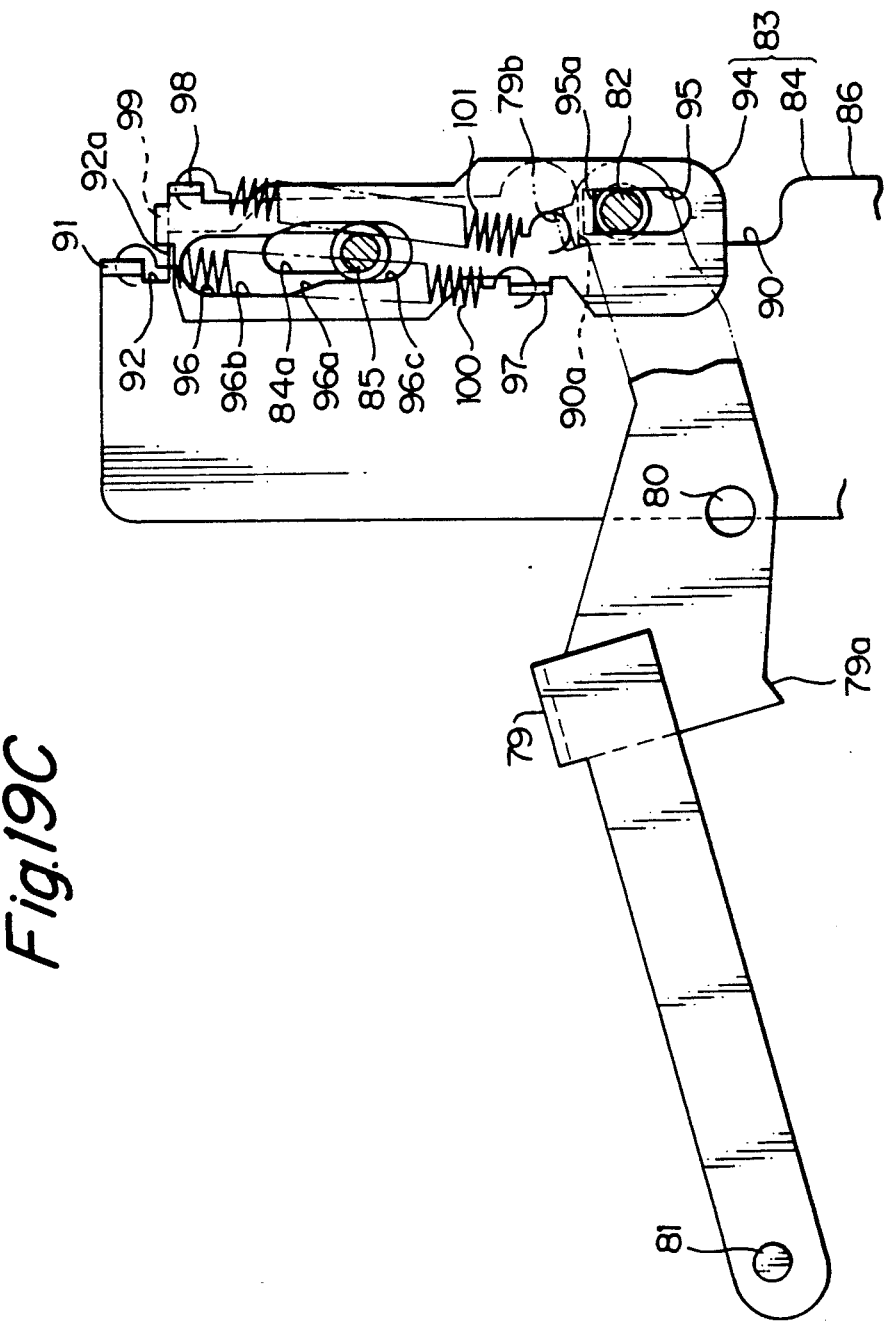
Figure 19D:
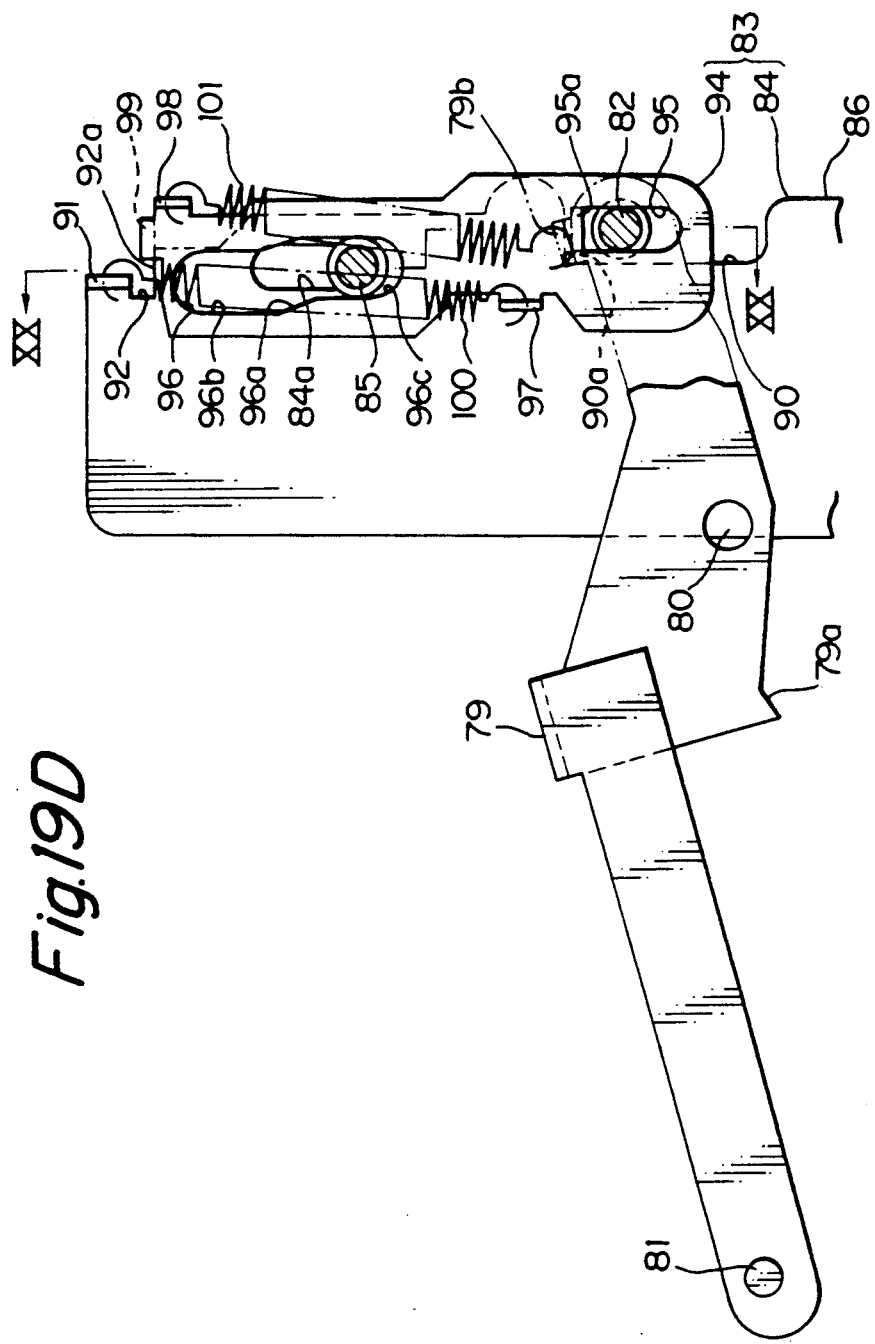
Figure 20A:
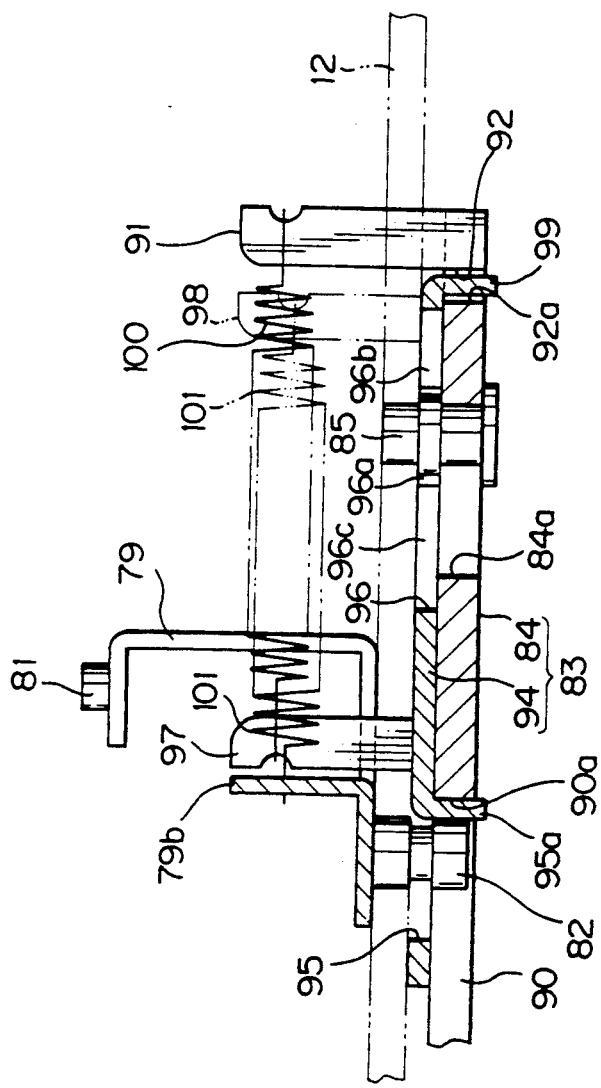
FIG. 20A is a cross-sectional view taken along the XX—XX line of FIG. 19A.

With reference to FIGS. 19 and 20, the pressure contact and release of the head drum will now be described.

As the main lever 84 is progressively pushed rearward from the state shown in FIG. 19A, the sublever 94 is moved rearward by a pulling force applied to the spring hook member 97 from the return spring 100. Sublever 94 then pivots in the counterclockwise direction, as seen from the upper side, because the slide edge of the middle portion 96a of the elongated guide holes 96 is urged by the guide pin 85 in a relatively forward, slightly oblique left direction. As a result, as shown in FIG. 19B, the engage member 99 of the sublever 94 enters the engage cutout 92 of the main lever 84 to engage its engage edge 92a. Thereafter, the engage edge 92a urges the engage member 99, and hence sublever 94, rearward.

As shown in FIG. 19B, as sublever 94 moves rearward, the head drum moving lever 79 pivots in the counterclockwise direction. This is because stopper pin 82 follows the confronting member 95a of the sublever 94 as it moves rearwardly. As a result, the head base 53 is moved forwardly, toward the position shown in FIG. 13.

When the main lever 84 has further moved rearward to the position shown in FIG. 19C, the head drum moving lever 79 reaches its advanced position and the head drum 21 reaches its first position, shown in FIG. 9. A this point, the confronting edges 24a and 25a engage the contact surfaces 9 of the cassette case 3 to prevent further forward movement of the head base 53. As a result, the head drum moving lever 79 is prevented from further counterclockwise pivotal movement.

Rearward movement of the main lever 84 is continuous until it reaches the mode establishing position shown in FIG. 19D, which is slightly more rearward than its position in FIG. 19C. Therefore, since further pivotal movement of the head drum moving lever 79 has been prevented, the contact member 95a of the sublever 94 is separated from the stopper pin 82 of the head drum moving lever 79, causing the limiter spring 101 to stretch as shown in FIG. 19D.

The stretching force of the expanded limiter spring 101 applies a counterclockwise pivotal force to the head drum moving lever 79. This, in turn, causes the confronting edges 24a and 25a of the head drum 21 to press against the contact surfaces of the cassette casing 3.

The main lever 84 is then locked in position by a lock lever 106, to be described later. When the lock of the main lever 84 is released, main lever 84 moves to its original non-depressed, position shown in FIG. 12 under the stretching force of the tension spring 88.

As the main lever 84 is returned to the non-depressed position, the contact member 95a of the sublever 94 first contacts the stopper pin 82 of the head drum moving lever 79 to release the pressure contact with the cassette casing 3 of the head drum 21. Further movement of the main lever 84 causes the head drum moving lever 79 to pivot in the clockwise direction due to the forward pressing force applied to the stopper pin 82 by the contact member 95a of the sublever 94. The side edge of the middle portion 96a of the elongated guide hole 96 of the sublever 94 is then urged by the guide pin 85 in a relatively rearward, slightly right oblique direction to cause the sublever 94 to pivot in the clockwise direction. This causes its engage member 99 to move to the right, out of the engage cutout 92. Upon arrival of the main lever 84 at its non-depressed position, the head drum moving lever 79 is moved to the stop position, thus returning the head drum 21 to its second position, shown in FIG. 12.

C. Release Lever and Lock Lever (FIGS. 2, 3, 12 to 18 and 21)

With reference to FIGS. 2, 3, 12 to 18 and 21, the operation of the release lever 102 and lock lever 106 will now be described. When the play lever 83 is depressed into the mode establishing position, or when the FF or REW lever, to be described, is depressed into its mode establishing position, namely, in the operation mode where the magnetic tape 5 runs, operation of the release lever 102 causes it to behave as a stop lever to release the operation mode and establish the stop mode. When operated in the stop mode, however, the release lever 102 behaves as an ejection lever to execute cassette ejection.

Figure 18:
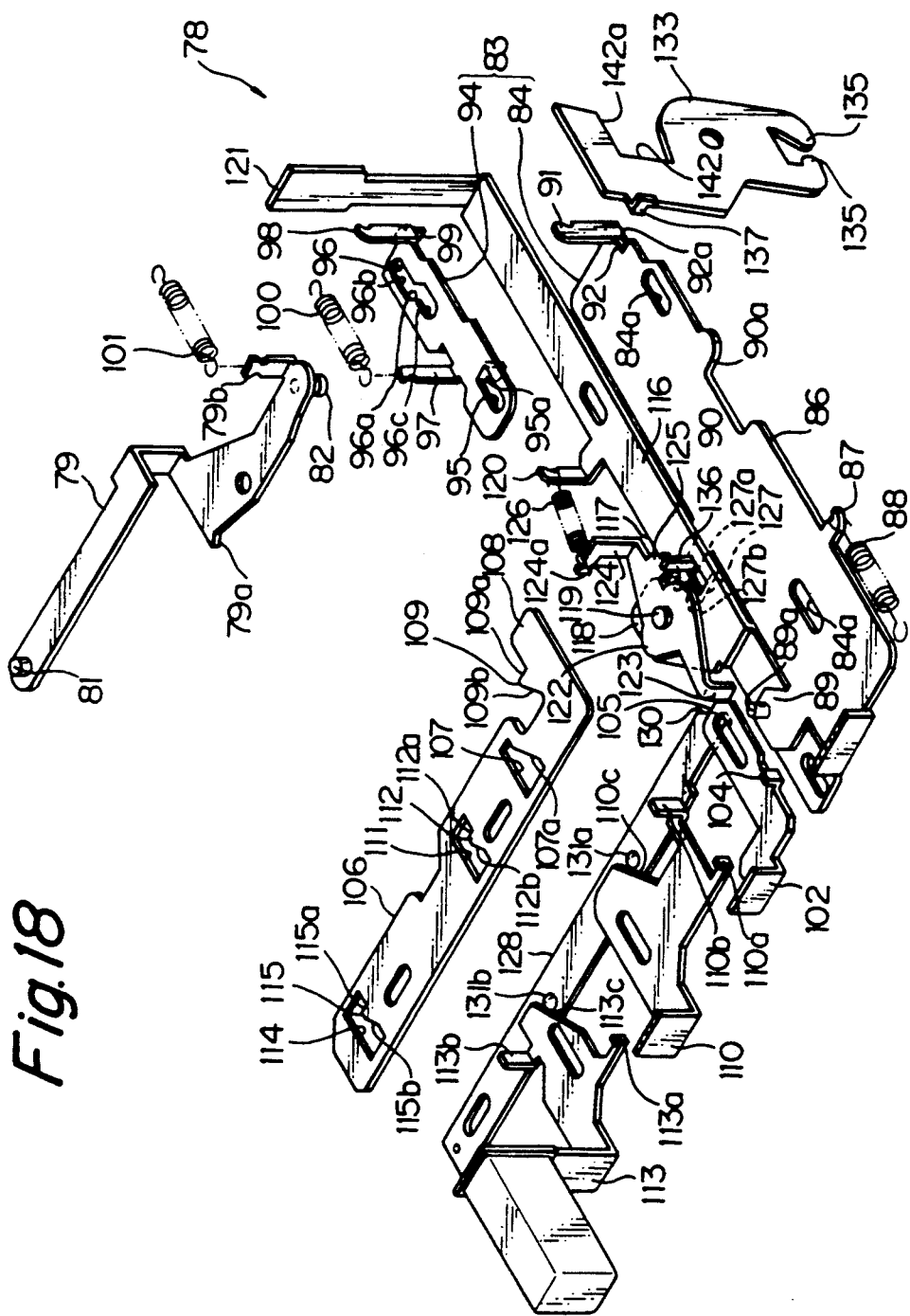
FIG. 18 is an exploded perspective view of part of the operating mechanism.

As shown in FIG. 12, for example, the release lever 102 is supported on the lower right surface of the main chassis 12, separated from the main lever 84 and slidable over a predetermined length. The release lever 102 is biased forwardly by resilient means (not shown), and has a push button 103 attached to its front end. As shown in FIG. 18, the release lever 102 has a pressing projection 104 upstanding from its right side edge.

The rear edge 105 of the release lever 102 behaves as a pressing edge for urging the intermediate lever, in a manner to be described later.

As seen in FIGS. 2 and 12, for example, lock lever 106, in the form of a plate elongated in the right/left direction is supported for sliding movement in the right-/left direction in the generally front end position of the bottom plate 15 of the main chassis 12. The lock lever 106 is biased to the left by resilient means (not shown).

A hole 107 is formed in a right position of the lock lever 106 and is elongated in the front/rear direction. The lock lever 106 has, along its right side edge, an edge to be pressed 107a which is slanted to the left progressively in the rear direction.

Figure 14:
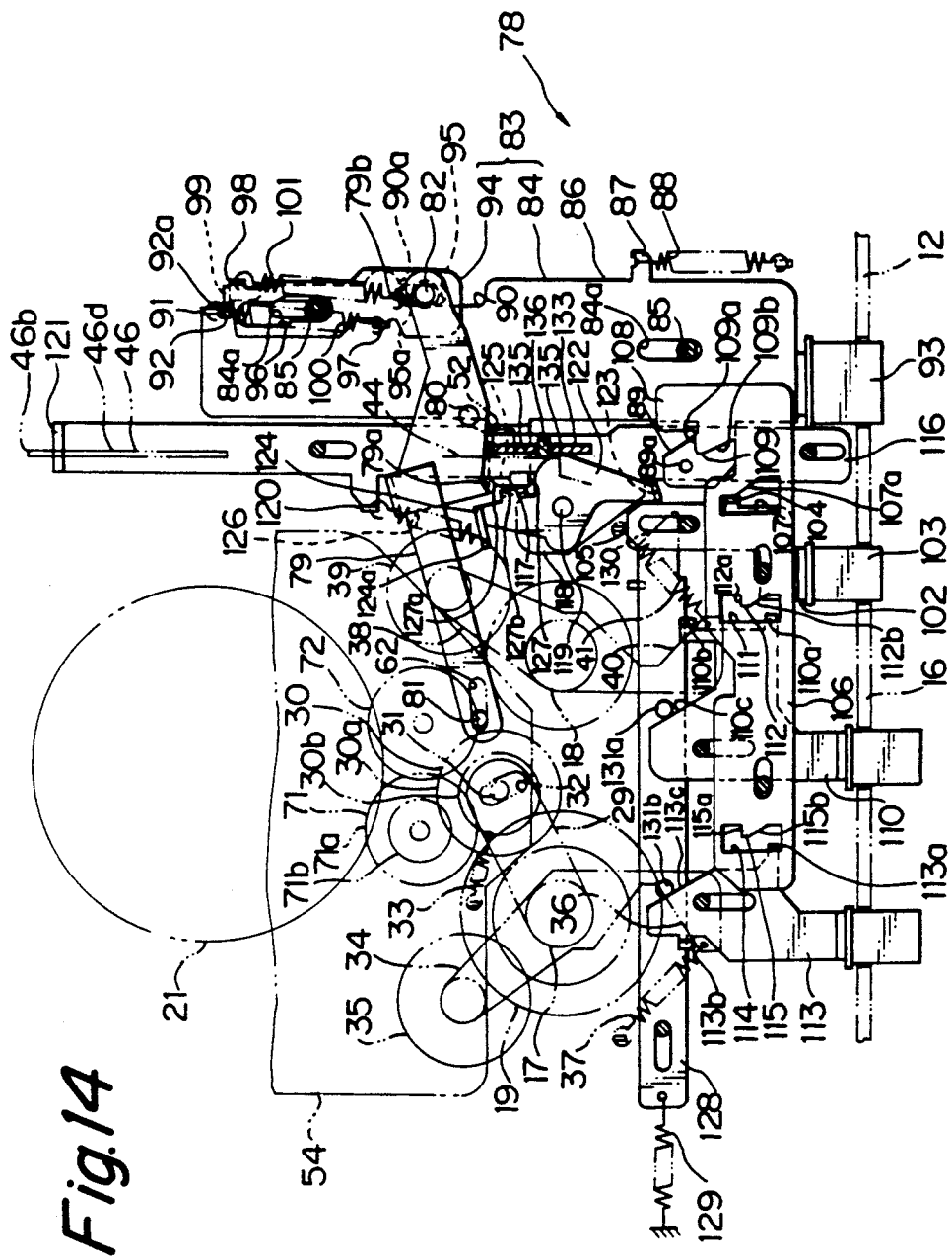
Figure 15:
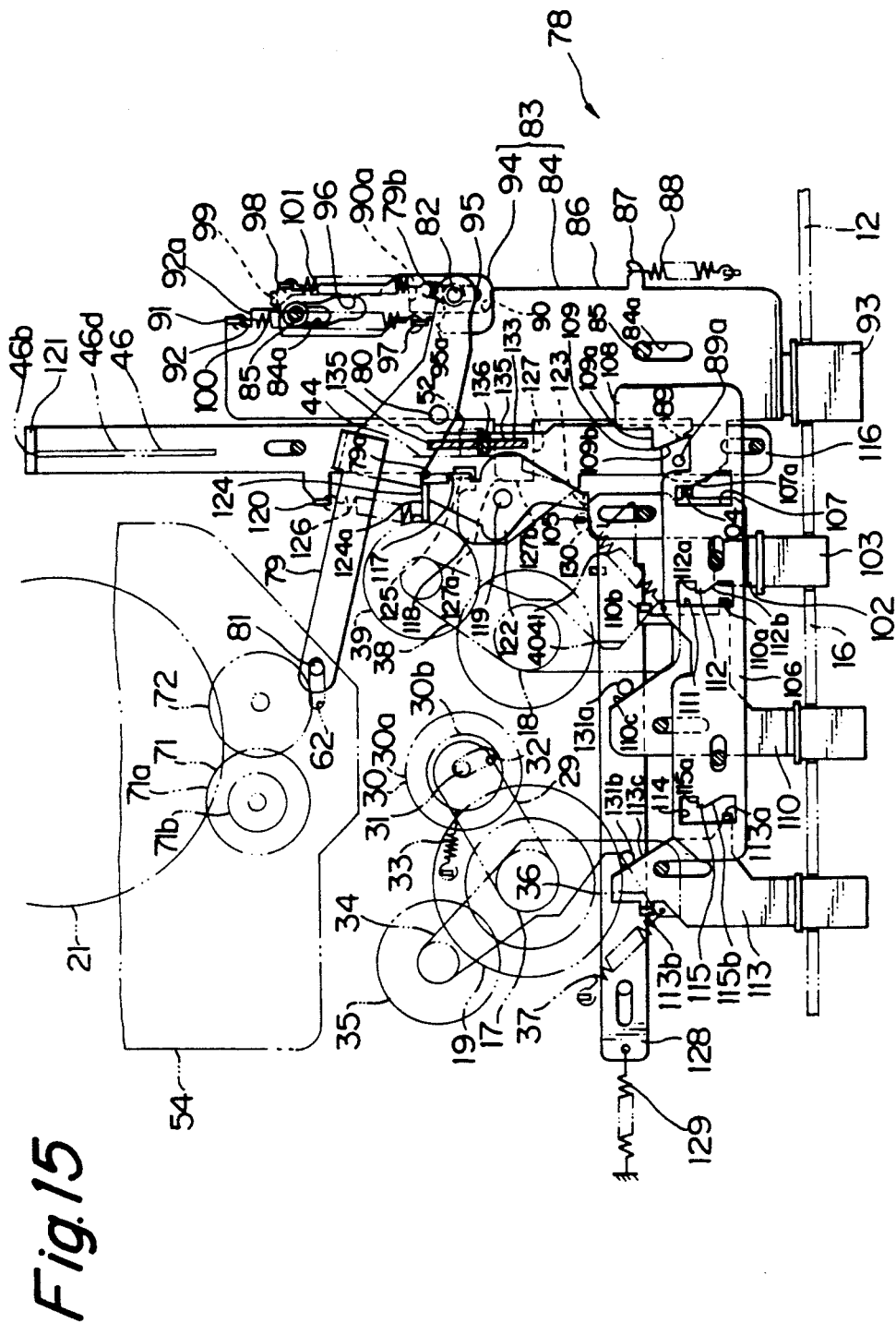
Figure 16:
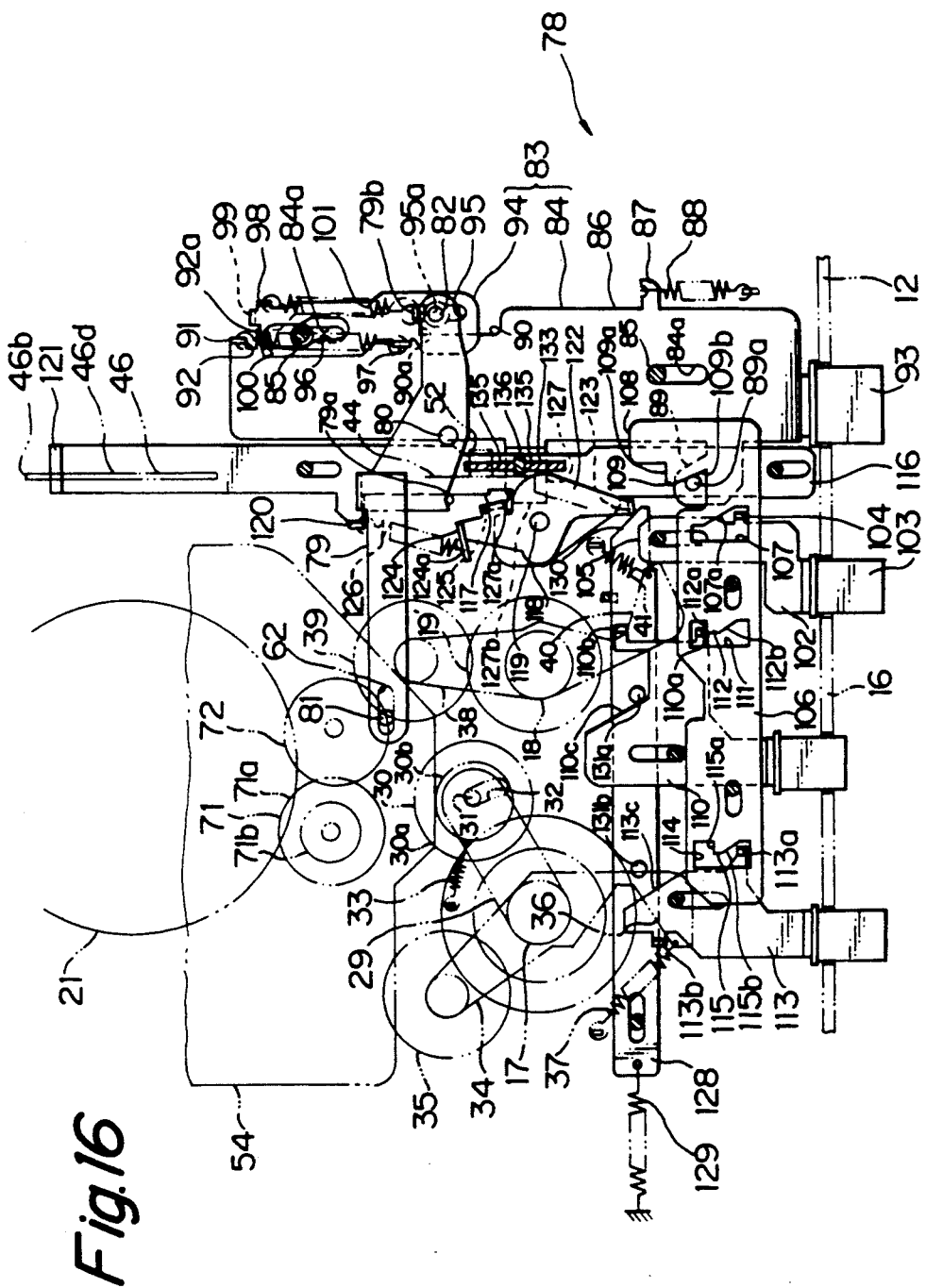
Figure 17:
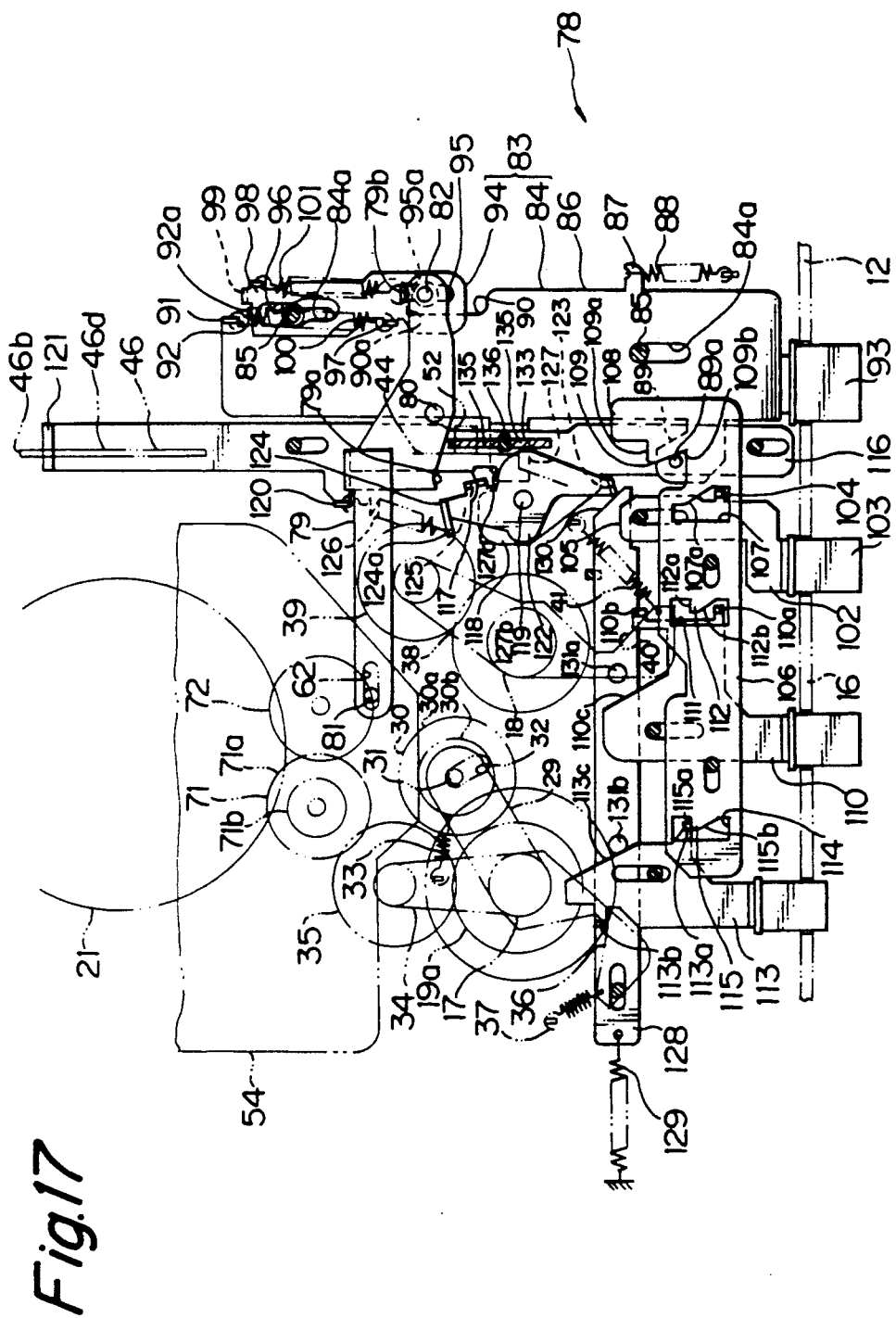

The pressing projection 104 of the release lever 102 is located in the hole 107 lock of the lock lever 106. When release lever 102 is not depressed, as shown in FIGS. 12 and 13, pressing projection 104 engages the front end portion of the right side edge of the hole 107. When the release lever 102 is depressed rearward, as shown in FIGS. 14 and 15, the pressing projection 104 urges the edge to be pressed 107a of the lock lever 106 to move the lock lever 106 to the right against the stretching force applied to it by resilient means (not shown). When the release lever 102 returns to its original position due to the tension force applied to it, the lock lever 106 also moves to the left and returns to its original position under the stretching force applied to it, as shown in FIGS. 16 and 17.

A click lock 109 extends to the left from the left side edge of a projection 108 extending rearward from the right end of the lock lever 106. A rear edge 109a of the click lock 109 is used as a lock edge extending in the right/left direction. An edge 109b extending forwardly from the left end of the lock edge 109a behaves as an edge to be pressed which is slanted to the right progressively in the front direction.

When the play lever 83 is in its non-depressed position, as shown in FIG. 12, its lock pin 89a substantially engages a front portion of the edge 109b to be pressed of the click lock 109. When the play lever 83 is depressed, its lock pin 89a urges the edge 109b of the lock lever 106 to move the lock lever 106 to the right. When the play lever 83 has reached its mode establishing position, shown in FIG. 13, the lock pin 89a is disengaged from the edge 109b rearward, so that the lock lever 106 moves to the left under a stretching force applied to it. This causes its lock edge 109a to move in front of the lock to lock in place pin 89a. As a result, even after the rearward urging force to the play lever 83 is removed, the lock pin 89a remains engaged by the lock edge 109a of the lock lever 106 to lock the play lever 83 in the mode establishing position, shown in FIG. 13.

Pushing the release lever 102 when the play lever 83 is locked in the mode establishing position shown in FIG. 13, the lock lever 106 moves to the right as explained above. This causes the lock edge 109a located in front of the pin 89a of the play lever 83 to move to the right, as shown in FIG. 14, thus permitting the play lever 83 to return to the non-depressed position under the biasing force of the tension spring 88.

D. REW Lever and FF Lever (FIGS. 2, 3 and 12 to 18)

The REW Lever and FF Lever will now be described with reference to FIGS. 2, 3, and 12 to 18. A REW lever 110 is supported by the lower surface of the main chassis 12 on the left side of the release lever 102 so that it is slidable in the front/rear direction, as shown in FIG. 12, for example. A forward moving force is applied to the REW lever 110 by resilient means (not shown). A lock member 110a and a pressing member 110b project from the REW lever 110, as shown in FIG. 18.

A hole 111 is disposed in the lock lever 106 on the left side of the hole 107 and is elongated in the front/rear direction. A click lock 112 projects to the left from the right side edge of the hole 111. A rear edge 112a of the click lock 112 behaves as a lock edge which extends in the right/left direction. An edge 112b which extends forwardly from the left edge of the lock edge 112a behaves as an edge to be pressed which is slanted to the right progressively in the front direction.

When the lock member 110a of the REW lever 110 is positioned in the hole 111 of the lock lever 106, and the REW lever 110 is in the non-depressed position shown in FIG. 12, the look member 110a is opposed to the edge to be pressed 112b of the click lock 112 from the front side. When the REW lever 110 is then depressed, the locking member 110a presses the lock edge 112b of the click lock 112, which causes the lock lever 106 to move to the right. When the REW lever 110 has reached the mode establishing position shown in FIG. 16, the locked member 110a is removed from the edge 112b to the rear side. This causes the lock lever 106 to move to the left under a stretching force applied to it, causing the lock edge 112a to move in front of the locked member 110a to lock it. As a result, even after the rearward pressing force is removed from the REW lever 110, the locked member 110a remains engaged by the lock edge 112a from the rear side, and the REW lever 110 is lockingly held in the depressed position shown in FIG. 16.

When the REW lever 110 moves from the non-depressed position to the mode establishing position, its pressing member 110b escapes from the cam edge 40 of the REW gear arm 38 to the rear side. This causes the REW gear arm 38 to be pivoted in the counterclockwise direction under a tension force of the tension spring 41 and causes the REW gear 39 to be brought into engagement with the relay gear 72, as shown in FIG. 16. Depressing the release lever 102 from this state causes the lock lever 106 to move toward the unlocking direction to release the lock. This, in turn, causes the REW lever 110 to return from the mode establishing position to the non-depressed position, shown in FIG. 12. At the same time, the pressing member 110b presses the cam edge 40 of the REW gear arm 38 to the front side, forcing the REW gear arm 38 to pivot in the clockwise direction against the stretching force of the tension spring 41 to separate the REW gear 39 from the relay gear 72.

A FF lever 113 is supported by the lower surface of the main chassis 12 on the left side of the REW lever 110 and is slidable in the front/rear direction. A forward moving force is applied to the FF lever 113 by resilient means (not shown). A locked member 113a and a pressing member 113b project from the FF lever 113.

A hole 114 is disposed in the lock lever 106 on the left side of the hole 111 and is elongated in the front/rear direction. A click lock 115 projects to the left from the right side edge of the hole 114. A rear edge 115a of the click lock 115 behaves as a lock edge extending in the right/left direction. An edge 115b extending forwardly from the left end of the edge 115a behaves as an edge to be pressed which is slanted to the right progressively in the front direction.

When the member 113a of the FF lever 113 is located in the hole 114 of the lock lever 106, and the FF lever 113 is located in the non-depressed position shown in FIG. 12, the locked member 113a is opposed to the edge 115b of the click lock 115 from the front side. When the FF lever 113 is depressed from this state, the locked member 113a presses the edge 115b of the click lock 115, which causes the lock lever 106 to move to the right. When the FF lever 113 has reached the mode establishing position shown in FIG. 17, the locked member 113a is removed from the edge 115b to the rear side. This causes the lock lever 106 to move to the left under the stretching force applied to it and causes the lock edge 115a to be located in front of the locked member 113a to lock it in place. As a result, even after the rear pressing force is removed from the FF lever 113, the locked member 113a remains engaged by the lock edge 115a from the rear side to lockingly hold the FF lever 113 in the mode establishing position.

When the FF lever 113 moves from the non-depressed position to the mode establishing position, the pressing member 113b escapes from the cam edge 36 of the FF gear arm 34. This permits the FF gear 34 to pivot in the clockwise direction under the stretching force of the tension spring 37 to bring the FF gear 35 into engagement with the large gear 71a of the relay gear 71, as shown in FIG. 17. When the release lever 102 is depressed from this state, the lock lever 106 moves in the unlocking direction to release the lock, which permits the FF lever 113 to return from the mode establishing position to the non-depressed position shown in FIG. 12. At the same time, the pressing member 113b presses the cam edge 36 of the FF gear arm 34 forwardly, forcing the FF gear arm 34 to pivot in the counterclockwise direction against the stretching force of the tension spring 37 to separate the FF gear 35 from the large gear 71a of the relay gear 71.

E. Head Drum Withdrawal Means

1. Head Drum Withdrawal Lever and Intermediate Lever (FIGS. 3, 4, 12 to 18 and 21)

With reference to FIGS. 3, 4, 12 to 18 and 21, the head drum withdrawal lever and intermediate lever will now be described. Head drum withdrawal lever 116 has, among others, a function of withdrawing the head drum 21 by cooperating with an intermediate lever 122, to be described later, to move the head base 53 rearward to move the head drum 21 to the third position, and a function of locking the cassette holder 44 in the loading position.

The head drum withdrawal lever 116 is in the form of an elongated plate which is long in the front/rear direction, and is supported by the lower surface of the main chassis 12 between the main lever 84 and the release lever 102 for slidable movement in the front/rear direction over a predetermined length. A forward moving force is applied to the head drum withdrawal lever 116 by a pivotal force applied to a holder pressing lever, to be described later. A stopper edge 117 is in a middle to front side portion of the left side edge of the head drum withdrawal lever 116. A support member 118 projects to the left from a position at the left side edge of the head drum withdrawal lever 116 closer to the front side than the stopper edge 117. A support shaft 119 is attached to a substantially central position of the support member 118.

A spring hook member 120 is upstanding from a distal end of a portion of head drum withdrawal lever 116 which projects slightly to the left of a substantially middle portion.

A tall rear end portion 121 of the head drum withdrawal lever 116 extends upwardly and behaves as a member to be locked in a manner to be described.

The intermediate lever 122 has a central portion pivotally supported by a support shaft 119 of the head drum withdrawal lever 116. The intermediate lever 122 extends substantially in the front/rear direction, with its front end having a member to be pressed 123 which extends vertically from it. Its rear end has a pressing member 124 upstanding from it. A restriction member 125 extends vertically downward from a substantially intermediate position in the front/rear direction of the rear right side edge of the intermediate lever 122, as can be seen in FIGS. 4 and 18.

A spring hook portion 124a is provided on an upper end portion of the pressing member 124. A tension spring 126 is interposed between the spring hook portion 124a and the spring hook member 120 of the head drum withdrawal lever 116 to exert a clockwise pivotal force on the intermediate lever 122 as seen from the upper side. Thus the intermediate lever 122 normally extends substantially in the front/rear direction, with the restriction member 125 in contact with the stopper edge 117 of the head drum withdrawal lever 116. This configuration is called a relay position (see FIG. 12). When the head drum withdrawal lever 116 is in a standby position, as shown in FIG. 12, and the intermediate lever 122 is in the relay position, the member 123 of the intermediate lever 122 is close to the pressing edge 105 of the release lever 102 from the rear side, and the pressing member 124 is closely opposed to the front side of the portion 79a of the head drum moving lever 79.

2. Intermediate Lever Switching Means (FIGS. 12 to 18)

With reference to FIGS. 12 to 18, the intermediate lever switching means will now be described.

A pressing member 127 extends to the left from a substantially middle portion of the left side edge of the main lever 84. A left end 127a of its rear side edge forms a pressing edge which is slanted in the forward direction progressively in the left direction. A left side edge 127b of the pressing member 127 is used as a holding edge extending in the front/rear direction.

A changeover slider 128 in the form of a plate is elongated in the right/left direction. The changeover slider 128 is supported by a front end portion of the upper surface of the bottom plate 15 of the main chassis 12 to be movable in the right/left direction over a predetermined extent. A tension spring 129 is interposed between the main chassis 12 and the changeover slider 128 to exert a leftward moving force on the changeover slider 128. A right end edge 130 of the changeover slider 128 acts as a pressing edge which is slanted to the left progressively in the rear direction. Right and left isolated projections to be pressed 131a and 131b each have a substantially hemispherical shape and extend upwardly from a middle portion of the changeover slider 128 in the right/left direction.

A rear end right side edge 110c of the REW lever 110 and a rear end right side edge 113c of the FF lever 113 act as pressing edges which are slanted to the left progressively in the rear direction. These pressing edges 110c and 113c are opposed to projections 131a and 131b of the changeover slider 128 from the left front side.

Therefore, when either the REW lever 110 or the FF lever 113 is depressed to the mode establishing position, shown in FIGS. 16 or 17, the pressing edge 110c or 113c presses the projection 131a or 131b in a rightward oblique rear direction, causing the changeover slider 128 to move to the right.

As long as the changeover slider 128 is not moved to the right, the pressing edge 130 of the changeover slider 128 is closely opposed to the motion path of the member 123 of the intermediate lever 122 located in the relay position.

When the head drum withdrawal lever 116 is in the advanced position shown in FIG. 12, and the intermediate lever 122 is in the relay position, the pressing edge 127a of the non-depressed main lever 84 is closely opposed to the restriction member 125 of the intermediate lever 122 from its front side. In addition, the pressing edge 130 of the changeover slider 128, which has not been moved to the right, is closely opposed to the lower end of the member 123 of the intermediate lever 122 from its left side.

With primary reference to FIG. 13 and 14, the stop function of the release lever will now be described.

When the play lever 83 is moved to the mode establishing position (FIG. 13) from the undepressed state, the pressing edge 127a presses the restriction member 125 of the intermediate lever 122 in a rear left direction, and causes the intermediate lever 122 to pivot in the counterclockwise direction against the stretching force of the tension spring 126. Further, along with the retraction of the play lever 83, the restriction member 125 contacts the holding edge 127b of the main lever 84 to hold the intermediate lever 122 in a non-relay position, shown in FIG. 13, slightly pivoted in the counterclockwise direction from the relay position.

When the intermediate lever 122 is in the non-relay position, as shown in FIG. 13, the member to be pressed 123 is rightwardly offset from the path of motion of the pressing edge 105 of the release lever 102, and the pressing member 124 is leftwardly offset from the moving track of the member 79a of the head drum moving lever 79.

As a result, when the release lever 102 is depressed to release the play mode, the pressing edge 105 does not press the member 123 of the intermediate lever 122, as shown in FIG. 14, but simply passes by it without contact. Accordingly, the lock lever 106 is simply moved to the right, i.e., in the unlocking direction, to return the play lever 83 to the non-depressed position, to return the head drum 21 to the second position and to return the intermediate lever 122 to the relay position, as shown in FIG. 12.

However, when the REW lever 110 or the FF lever 113 is moved to the mode establishing position, as shown in FIGS. 16 or 17, respectively, the changeover slider 128 is moved to the right as explained above. As a result, the pressing edge 130 of the changeover slider 128 presses the member 123 of the intermediate lever 122 to move the intermediate lever 122 to the non-relay position.

Therefore, when the release lever 102 is depressed to release the FF mode or the REW mode, the pressing edge 105 of the release lever 102, again, does not press the member 123 of the intermediate lever 122, but simply passes by it without contact. Accordingly, the lock lever 106 is moved in the unlocking direction to permit the REW lever 110 or the FF lever 113 to return to the non-depressed position shown in FIG. 12. This causes the changeover slider 128 to return to the left and the intermediate lever 122 to return to the relay position.

Thus the release lever 102 behaves as a stop lever for releasing a current operation mode and establishing the stop mode when operated from a state where an operation mode such as play mode, FF mode, REW mode, etc. has been established.

1. Ejecting Function of the Release Lever (FIG. 15)

With primary reference now to FIG. 15, the ejecting function of the release lever will be described. As explained above, when loading or ejection of the tape cassette 2 is executed, in other words, when the cassette holder 44 is moved between the ejecting position and the loading position, the head drum 21 is first moved to the third position.

This movement is executed by depressing the release lever 102 in the stop mode.

More specifically, in the stop mode, shown in FIG. 12, the head drum withdrawal lever 116 is in the standby position, and the intermediate lever 122 is in the relay position. Therefore, when the release lever 102 is depressed from this state, the pressing edge 105 presses the member 123 of the intermediate lever 122 rearward, as shown in FIG. 15. This causes the intermediate lever 122 to move rearward together with the head drum withdrawal lever 116. During this movement, the pressing member 124 of the intermediate lever 122 presses the member 79a of the head drum moving lever 79 substantially rearward and forces the head drum moving lever 79 to pivot in the clockwise direction. As a result, the head base 53 is moved rearward, and the head drum withdrawal lever 116 is moved to the depressed position shown in FIG. 15. The head drum moving lever 79 then reaches the retracted position, and the head drum 21 is accordingly moved to the third position.

Note that, as shown in FIG. 11, when the head drum 21 reaches the third position, it is spaced by a certain amount rearward from the cassette casing 3, and therefore withdraws to the exterior of the cassette casing 3 by the time the head drum moving lever 79 has come to a substantially middle position between the stop position and the retracted position. That is, the head drum 21 withdraws to the exterior of the cassette casing 3 before the head drum withdrawal lever 116 reaches the fully depressed position.

Note that the lock of the cassette holder 44 in the loading position is released in response to the rearward movement of the head drum withdrawal lever 116 (this release will be described later), which causes the cassette holder 44 to move to the ejecting position. This in turn, prevents the head drum withdrawal lever 116 from returning forwardly (this prevention will also be described later). As a result, the head drum moving lever 79 is locked in the retracted position, and the head drum 21 is held in the third position.

Thus the release lever 102 behaves as an ejecting lever, in the stop mode, for withdrawing the head drum 21 out of the tape cassette 2 and for executing cassette ejection.

G. Operating Force During Ejection (FIG. 15)

As described above, when the release lever 102 is depressed in the stop mode, the head drum moving lever 79 is pivoted from the stop position to the retracted position to bring the head drum 21 to the third position.

When the head drum moving lever 79 moves to the retracted position, its right end moves in substantially a forward direction. This causes the spring hook member 79b to pull the limiter spring 101 forwardly. Since the stretching force of the limiter spring 101 is stronger than the stretching force of the return spring 100 interposed between the sublever 94 and the main lever 84, the sublever 94 follows the right end of the head drum moving lever 79, with its contact member 95a being held in contact with the stopper pin 82 of the head drum moving lever 79.

Therefore, when the head drum moving lever 79 moves to the retracted position, the return spring 100 is expanded, as shown in FIG. 15, but the limiter spring 101 is not expanded.

As a result, when the play lever 83 is depressed to establish the play mode, the limiter spring 101, having a stronger stretching force, is stretched to exert a pressure contact force for bringing the head drum 21 into pressure contact with the cassette casing 3. In contrast, when the release lever 102 is depressed to execute cassette ejection, the return spring 100, having a weaker stretching force, is stretched. Therefore, as compared to a construction in which the limiter spring is interposed between a play lever of a single sheet structure and the head drum moving lever, the load received upon depressing the release lever 102 is decreased significantly. As a result, while ensuring a necessary force for pressure contact of the head drum, the operational force needed to execute ejection is light.

Note that when the head drum withdrawal lever 116 returns to the standby position from the state where the head drum moving lever 79 is locked in the retracted position, rearward pressure of the intermediate lever 122 is removed from the head drum moving lever 79.

This permits the head drum moving lever 79 to pivot in the counterclockwise direction and return to the stop position under the stretching force of the return spring 100. This in turn moves the head drum 21 to the second position.

VIII. Cassette Ejecting Mechanism (FIGS. 2 to 4, 12 to 18 and 21)

A cassette ejecting mechanism composed of the cassette holder 44, head drum withdrawal lever 116, holder pressing lever and others, will now be described with reference to FIGS. 2 to 4, 12 to 18 and 21.

a. Mutual Lock between the Cassette Holder and the Head Drum Withdrawal Lever When the cassette holder 44 is in the loading position, the lower side edge 46e of this portion to be locked 46d, i.e., the rear end portion 46d of the right arm 46, is in a substantially horizontal orientation extending in the front/rear direction, as shown in FIG. 4.

The right arm 46 is located above a substantially middle portion in the width direction of the head drum withdrawal lever 116. The upper end of the lock portion 121, which is a rear end portion of the head drum withdrawal lever 116, is located substantially at the same level as the lower side edge 46e of the portion 46d of the cassette holder 44. When the head drum withdrawal lever 116 is held in the standby position, its lock portion 121 is located under and slightly forward of the rear end of the portion 46d, as shown in FIG. 4.

In this state, since downward pivotal movement of the portion 46d is prevented by the lock portion 121, the cassette holder 44 is prevented from moving toward the ejecting position and is thus lockingly held in the loading position.

When the head drum withdrawal lever 116 is moved from this state to the depressed position, (as shown by an alternate long and two short dashes line in FIG. 21A), the lock portion 121 is moved to a position rearwardly offset from the pivotal path of the rear end edge 46b of the portion 46d of the cassette holder 44.

As a result, since downward movement of the member 46d by the lock portion 121 is no longer prevented, the cassette holder 44 moves to the ejecting position under the stretching force of the scissor-shaped spring 50. When the cassette holder 44 has moved to the ejecting position, the rear end of the portion 46d, as shown in FIG. 21B, comes to a position slightly lower than the support shaft 48, which is the pivotal center of the cassette holder 44, where it is located in front of the lock portion 121 of the head drum withdrawal lever 116. Forward movement of the lock portion 121 is then prevented by the lock portion 46 of the cassette holder 44, and the head drum withdrawal lever 116 is lockingly held in the depressed position.

When the cassette holder 44 is located in the loading position, and the head drum withdrawal lever 116 is in the standby position, the cassette holder 44 is locked in the loading position by the lock portion 121 of the head drum withdrawal lever 116. When the head drum withdrawal lever 116 is moved from this state to the depressed position by depressing the release lever 102 in the stop mode, as explained above the head drum 21 is first withdrawn from the cassette casing 3. Immediately thereafter, the head drum withdrawal lever 116 reaches the depressed position, with the head drum moving lever 79 reaching the retracted position. This causes the head drum 21 to move to the third position. Substantially at the same time, the cassette holder 44 is moved to the ejecting position and the head drum withdrawal lever 116 is locked in the depressed position, with the head drum 21 being held in the third position.

When the cassette holder 44 reaches the ejecting position, the rear end edge 46b of the portion to be locked 46d is moved slightly forward of the lock portion 121 of the head drum withdrawal lever 116. As a result, when the release lever 102 is no longer depressed, the head drum withdrawal lever 116 moves ahead to a position where its lock portion 121 contacts the locking portion 46d. Therefore, the head drum moving lever 79 is returned slightly forward from the retracted position. In response, the head drum 21 is moved slightly forward of the third position and held there.

When the cassette holder 44 moves from the ejecting position to the cassette loading position, the lower end edge 46e of the portion 46d is removed upwardly from the upper end of the lock portion 121 of the head drum withdrawal lever 116, permitting forward movement of the lock portion 121. As a result, the head drum withdrawal lever 116 is returned to the standby position, and the lock portion 121 is simultaneously positioned under the portion 46d of the cassette holder 44. Thus the cassette holder 44 is locked in the loading position, and the head drum moving lever 79 returns to the stop position and moves the head drum 21 to the second position.

Since withdrawal of the head drum 21 from the cassette casing 3, locking and unlocking of the head drum 21 at the loading position with respect to the cassette holder 44, holding of the head drum 21 in the position where it is withdrawn from the interior of the cassette casing 3 and insertion of the head drum 21 into the interior of the cassette casing 3 are all carried out sequentially by the cassette holder 44 and the head drum withdrawal lever 116, timings necessary for these motions are reliably controlled. Therefore, the tape cassette 2 will not hit the head drum 21 when the tape cassette is loaded or removed, and the mechanism can be composed of the minimum number of members.

b. Holder Pressing Lever

A holder pressing lever 133 for holding the cassette holder 44 in a pressure contact state in the loading position will now be described.

The holder pressing lever 133 is located between a front end portion of the side wall 13 and the cassette holding portion 45 of the cassette holder 44 when the cassette holder 44 is in the loading position. A substantially central portion of the holder pressing lever 133 is pivotally supported on the side wall 13 by a support shaft 134. A coupling member 136, cut and raised from the head drum withdrawal lever 116, is pivotally interposed between two leg portions 135 disposed at lower end portions of the holder pressing lever 133.

A stopper member 137 extending rightward from a front end portion of the front side edge of the holder pressing lever 133 extends rightward beyond the side wall 13 through an elongated hole 138 formed in the side wall 13. A right end portion of the stopper member 137 is used as a spring hook portion.

A torsion spring 139 whose coil portion 139a engages the outer periphery of a spring support portion 140 that extends rightward from the upper edge of the side wall 13 above the support shaft 134. Two arms 139b and 139c of the torsion spring 139 resiliently contact, respectively, the right end portion of the stopper member 137 and a spring hook portion 141 extending rightward from the lower edge of the side wall 13. A clockwise pivotal force, as seen from the right side, is applied to the holder pressing lever 133 by the stretching force of the torsion spring 139, so that, unless it is moved in the counterclockwise direction due to movement of head drum withdrawal lever 116, its stopper member 137 is held in a pressing position in contact with an upper end edge of the elongated hole 138, as can be seen in FIG. 4.

Due to the pivotal force applied to the holder pressing lever 133, a forward pressing force is applied to the coupling member 136 of the head drum withdrawal lever 116. This pressing force behaves as a force for moving the head drum withdrawal lever 116 to the standby position.

A cutout 142 is formed to open rearwardly in an upper portion of the holder pressing lever 133. An upper pressing edge 142a of the cutout 142 is located to intersect the pivotal path of the member 52 formed in the cassette holder 44 when the holder pressing lever 133 is in the pressing position.

When the head drum withdrawal lever 116 is in the standby position, the holder pressing lever 133 is held in the pressing position. When the head drum withdrawal lever 116 is moved rearward from this state, its coupling member 136 presses the leg portion 135 of the holder pressing lever 133 rearward, which causes the holder pressing lever 133 to be pivoted in the counterclockwise direction, as seen from the right side. As a result, the pressing edge 142a moves forwardly out of the pivotal path of the locking pin 52 of the cassette holder 44. When the rearward pressing force is removed from the head drum withdrawal lever 116, the holder pressing lever 133 is permitted to return to its pressing position under the stretching force of the torsion spring 139, and the head drum withdrawal lever 116 is simultaneously returned to the standby position.

When the cassette holder 44 is moved to the loading position from the ejecting position, the holder pressing lever 133 is moved to the pressing position shown in FIG. 4. In this position, its pressing edge 142a engages the pin 52 of the cassette holder 44 from the upper side. Due to this engagement, the pin 52 is pressed in a substantially downward direction. Accordingly, cassette holder 44 is held in a pressure contact state in the loading position.

Figure 21A:
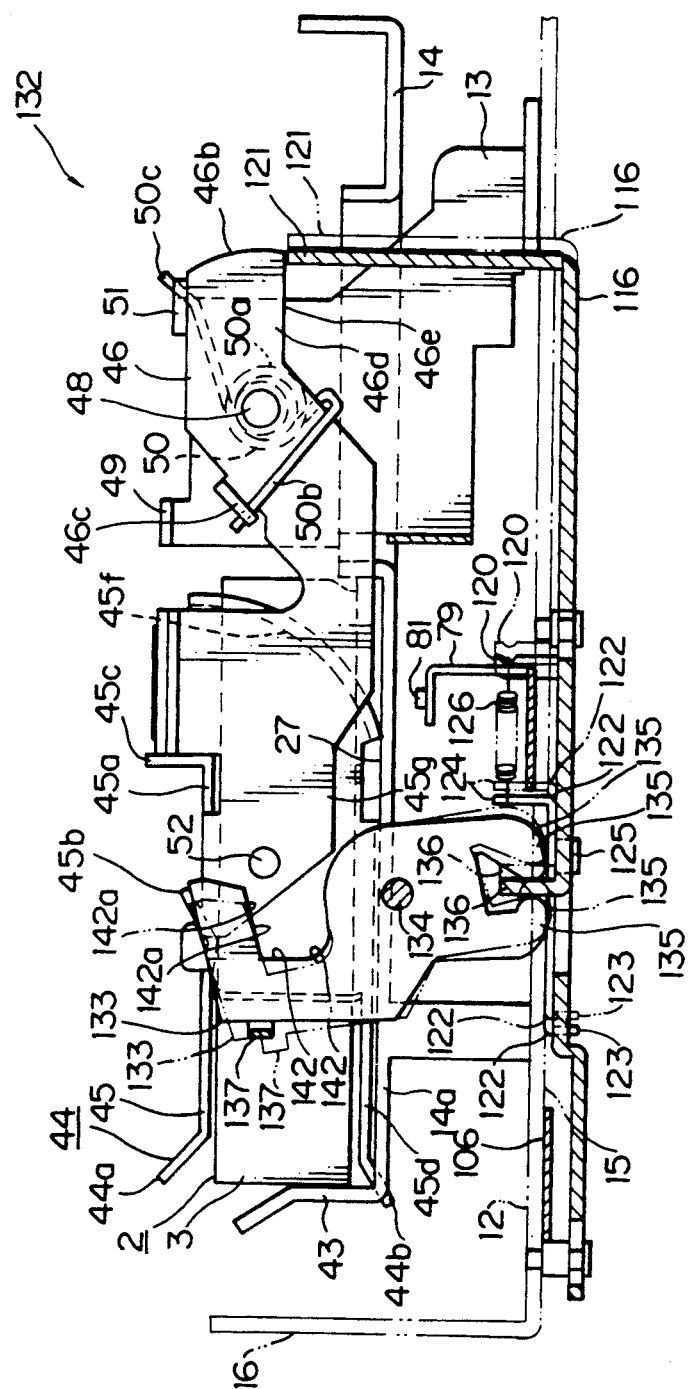
Figure 22:
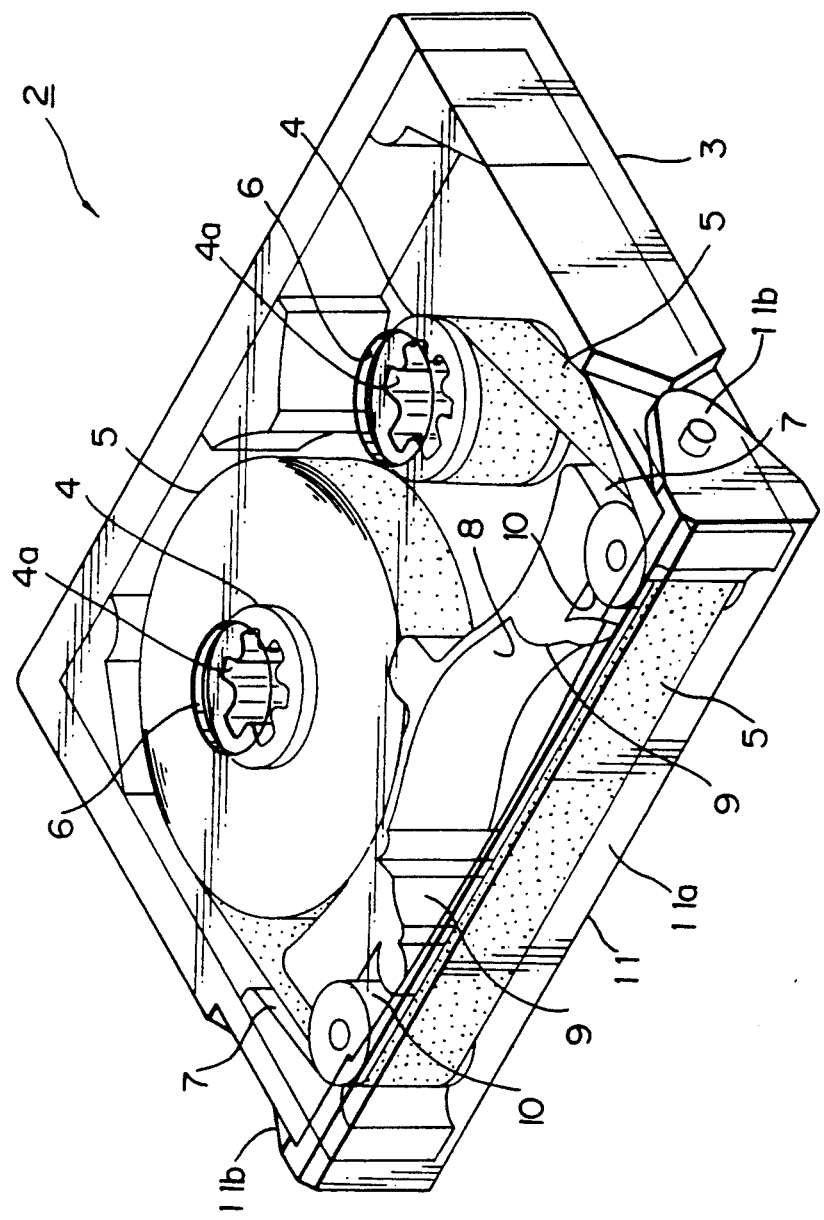
FIG. 22 is a perspective view of a tape cassette operable in the tape player.

In the state shown by a solid line in FIG. 21A, before the holder pressing lever 133 presses the pin 52 and while the locking portion 121 of the head drum withdrawal lever 116 is located under the locking portion 46d of the cassette holder 4, the cassette holder 44 is positioned slightly nearer to the ejecting position than the loading position. When pressure is applied from the holder pressing lever 133 to the pin 52 from this state, the cassette holder 44 moves fully to the loading position, shown in FIG. 4, and is held there.

When the ejecting operation is commenced from this state, with the head drum withdrawal lever 116 moved rearward, the holder pressing lever 133 is first pivoted in the counterclockwise direction, as seen from the right side, and its pressing edge 142a gets out of the pivotal path of the pin 52, as shown by the solid line in FIG. 21A. Subsequently, the lock portion 121 of the head drum withdrawal lever 116 is moved out of the pivotal path of the portion 46d of the cassette holder 44, and the cassette holder 44 is moved to the ejecting position.

IX. Operation

The operation of the above-described tape player 1 is explained below.

To insert the tape cassette 2, the release lever 102 is first depressed. In response, the member to be pressed 123 of the intermediate lever 122 is pressed by the pressing edge 105 of the release lever 102, causing the intermediate lever 122, together with the head drum withdrawal lever 116, to move rearward. The portion to be pressed 79a of the head drum moving lever 79 is pressed rearward by the pressing member 124 of the rearward moving intermediate lever 122. As a result, the head drum moving lever 79 is pivoted in the clockwise direction, the head base 53 is moved rearward, and the head drum 21 is moved to the third position.

When the head drum withdrawal lever 116 is retracted, with its lock portion 121 getting out of the pivotal path of the portion 46d of the cassette holder 44 to the rear side, the cassette holder 44 is unlocked and moved to the ejecting position.

As the tape cassette 2 is inserted into the cassette holder 44 when it is in the ejecting position, the front lid 11 is moved to the open position. The tape cassette 2 is reversible and, whichever direction it is inserted in the cassette holding portion 45, the front lid 11 is pivoted upwardly (see FIG. 4). Recording on the magnetic tape 5 is performed so that a slanted recording track is formed by so-called helical scan in one of two divided regions in the width direction.

When the tape cassette 2 is brought to the loading position by pivoting the cassette holder 44 downward with the tape cassette 2 inserted therein and moving it to the cassette loading position, the head drum 21 is unlocked from the third position. The head drum moving lever 79 is then pivoted to the stop position by the stretching force of the return spring 100, causing the head drum 21 to reach the second position. This state, shown in FIG. 12, is the stop state (stop mode). In this state, the relay gears 71 and 72 are located apart from the play gear 30, FF gear 35 and REW gear 39.

When the FF lever 113 is moved from this state to the FF mode establishing position, as shown in FIG. 17, the FF gear 35 engages the large gear 71a of the relay gear 71, and the drum motor 67 of the head drum 21 is rotated. This establishes the FF mode, in which the reel base 17 is rotated in the tape takeup direction at a high speed.

When the REW lever 110 is moved from the stop state to the REW mode establishing position, as shown in FIG. 16, the REW gear 39 engages the relay gear 72, and the drum motor 67 is rotated. This establishes the REW mode, in which the reel base 18 is rotated in the tape takeup direction at a high speed.

When the head drum 21 is in the second position, the magnetic heads 23 move while maintaining light contact with the magnetic tape 5. Therefore, the search mode may also be established by simultaneously reading signals with the magnetic heads 23 while feeding the magnetic tape 5 at a high speed as in the FF and REW modes.

The high-speed search mode may be established directly from any mode except the stop mode. This is because the lock lever 106 is moved in the unlocking direction upon depression of the FF lever 113 or REW lever 110, which causes the immediately preceding mode to be canceled and a mode responsive to depression of the FF lever 113 or REW lever 110 to be established.

When the play lever 83 is subsequently moved to the play mode establishing position, the head drum 21 is moved to the first position as described above, and the small gear 71b of the relay gear 71 engages the large gear 30a of the play gear 30. At this time, the play gear arm 29 is pivoted slightly in the clockwise direction, and the tension spring 33 is stretched. As a result, the small gear 71b of the relay gear 71 and the large gear 30a of the play gear 30 are held in appropriate pressure contact. The drum motor 67 is then rotated, causing reel base 17 to rotate in the tape takeover direction. This is the recording and/or playback mode.

The recording and/or playback mode is released by depression of the REW lever 110 or FF lever 113 and replaced by a mode corresponding to depression of the lever.

The head drum withdrawal lever in the foregoing embodiment is composed of a part for performing withdrawal of the head drum from the interior of the tape cassette and a part having the lock portion, and these two parts are pivotally coupled. This is, however, only for the purpose of incorporating both the stop lever function and the ejecting lever function in a single release lever. Construction of the head drum withdrawal lever in the invention need not be limited to such structure.

What is claimed is:

1. A cassette ejecting mechanism of a tape player comprising:
   a chassis;
   cassette holder means for holding a tape cassette having a tape, said cassette holder means having a locking portion and a lockable portion;
   means for pivotably mounting said cassette holder means on said chassis for movement about a pivotal axis between an ejecting position permitting insertion and removal of the tape cassette and a loading position permitting the tape to be driven;
   first biasing means for biasing said cassette holder means toward said ejecting position;
   head base means for supporting a magnetic head means for recording or reproducing information signals on or from said tape;
   means for mounting said head base means on said chassis for movement between retracted and engaged positions relative to said loading position of said cassette holder means, said magnetic head means being located outside said tape cassette when said head base means is in said retracted position and said cassette holder means is in said loading position, and at least part of said magnetic head means being located inside said tape cassette when said head base means is in said engaged position and said cassette holder means is in said loading position;
   driving lever means for moving said head base means between said retracted and engaged positions;
   operating lever means movable with respect to said chassis for initiating movement of said cassette holder means toward said ejecting position;
   intermediate lever means movable in response to movement of said operating lever means, for causing movement of said driving lever means, said intermediate lever means including a lock member; and second biasing means for biasing said head base means toward said engaged position;

said lock member of said intermediate lever means being engageable with said lockable portion of said cassette holder means for preventing movement of said cassette holder means toward said ejecting position by said first biasing means when said head base means is in said engaged position; and said locking portion of said cassette holder means being engageable with said lock member of said intermediate lever means for preventing movement of said head base means toward said engaged position by said second biasing means when said cassette holder means is in said ejecting position.

2. The cassette ejecting mechanism of a tape player according to claim 1, wherein said cassette holder means comprises:

a long arm portion that has a holding portion for holding the tape cassette; and a short arm portion that is opposite to said long arm portion with respect to said pivotal axis of said cassette holder means, said short arm portion including said lockable portion of said cassette holder means.

3. The cassette ejecting mechanism of a tape player according to claim 1, wherein the tape player has a STOP mode, a FF mode and a REW mode and said head base means is in said engaged position when the tape player is in said STOP mode, said FF mode and said REW mode.

4. The cassette ejecting mechanism of a tape player according to claim 1, further comprising play operating lever means for initiating a recording or playback mode of the tape player, and wherein said head base means is further movable to a play position in which more of said magnetic head means is located inside said tape cassette than is the case when said head base means is in said engaged position, said play operating lever means being operable to cause said driving lever means to move said head base means to said play position.

5. The cassette ejecting mechanism of a tape player according to claim 1, wherein said cassette holder means includes lid opening and closing means for opening and closing a lid of said tape cassette in response to insertion and removal, respectively, of said tape cassette in respect to said cassette holder means when said cassette holder means is in said ejecting position.

6. The cassette ejecting mechanism of a tape player according to claim 1, wherein:

said cassette holder means includes a side plate portion that has a pressure pin formed thereon; and said intermediate lever means has an engageable portion;

said cassette ejecting mechanism further comprising pressure lever means pivotably mounted on said chassis for pressingly holding said cassette holder means in said loading position, said pressure lever means having pressing means at one end thereof for engaging said pressure pin of said cassette holder means and having engaging means at another end thereof for engaging said engageable portion of said intermediate lever, said pressure lever means being pivotable in response to movement of said intermediate lever means for disengaging said pressing means from said pressure pin of said cassette holder means.

7. The cassette ejecting mechanism of a tape player according to claim 1, wherein said cassette holder means comprises:

a long arm portion that has a holding portion for holding the tape cassette; and a short arm portion that is opposite to said long arm portion with respect to said pivotal axis of said cassette holder means, said short arm portion including said locking portion of said cassette holder means.

8. The cassette ejecting mechanism of a tape player according to claim 7, wherein said short arm portion includes said lockable portion of said cassette holder means.

9. The cassette ejecting mechanism of a tape player according to claim 1, wherein said driving lever means is pivotally mounted on said chassis and has an end that is linked to said head base means.

10. The cassette ejecting mechanism of a tape player according to claim 9, wherein said driving lever means has another end that is linked to said second biasing means and said second biasing means includes means for biasing said driving lever means for pivotal movement that drives said head base means toward said engaged position.

11. The cassette ejecting mechanism of a tape player according to claim 1, wherein said intermediate lever means has sublever means, pivotably mounted on said intermediate lever means, for selectively engaging said operating lever means; said sublever means being operable for engaging and moving said driving lever means only when said operating lever means and said sublever means are in engagement.

12. The cassette ejecting mechanism of a tape player according to claim 11, further comprising:

play operating lever means for initiating a recording or playback mode of the tape player;

FF operating lever means for initiating a fast forward mode of the tape player;

REW operating lever means for initiating a rewind mode of the tape player; and means movable upon depression of one of said FF and REW operating lever means for pivoting said sublever means to a position in which said sublever means is not engageable by said operating lever means;

said play operating lever means being operable to pivot said sublever means to a position in which said sublever means is not engageable by said operating lever means.

13. The cassette ejecting mechanism of a tape player according to claim 1, wherein said magnetic head means comprises a head drum that includes a rotary head.

14. The cassette ejecting mechanism of a tape player according to claim 13, wherein there are mounted on said head base means a capstan, a motor and gears, said motor being operable to drive said rotary head and said capstan by said gears.

* * * * *